United States Patent
Wetsch et al.

(10) Patent No.: US 11,524,475 B2
(45) Date of Patent: Dec. 13, 2022

(54) PROTECTIVE PACKAGING LONGITUDINAL HEAT SEALER

(71) Applicant: Pregis Innovative Packaging LLC, Deerfield, IL (US)

(72) Inventors: Thomas D. Wetsch, Naples, FL (US); Paul F. Ostwald, Queensbury, NY (US); William J. Watts, Oak Lawn, IL (US)

(73) Assignee: Pregis Innovative Packaging LLC, Deerfield, IL (US)

( * ) Notice: Subject to any disclaimer, the term of this patent is extended or adjusted under 35 U.S.C. 154(b) by 0 days.

(21) Appl. No.: 17/222,617

(22) Filed: Apr. 5, 2021

(65) Prior Publication Data

US 2021/0221088 A1 Jul. 22, 2021

Related U.S. Application Data

(63) Continuation of application No. 15/474,839, filed on Mar. 30, 2017, now Pat. No. 10,967,600.
(Continued)

(51) Int. Cl.
*B31D 5/00* (2017.01)
*B29C 65/22* (2006.01)
(Continued)

(52) U.S. Cl.
CPC .......... *B31D 5/0073* (2013.01); *B29C 65/222* (2013.01); *B29C 65/224* (2013.01);
(Continued)

(58) Field of Classification Search
CPC ..... B65B 43/123; B65B 43/267; B65B 51/10; B65B 51/26; B31D 5/0073; B29C 65/224;
(Continued)

(56) References Cited

U.S. PATENT DOCUMENTS 2,904,100 A  9/1959 Fener
2,963,838 A  12/1960 Harrison et al.
(Continued)

FOREIGN PATENT DOCUMENTS

DE  1134195 B  8/1962
EP  0395438 A1  10/1990
(Continued)

OTHER PUBLICATIONS

Kapton Tape, "1 Mil Kapton Tapes" Mar. 3, 2013. Retrieved from the internet on May 30, 2017 <https://www.kaptontape.com/1_Mil_Kapton_Tapes.php>; 1 page.
(Continued)

*Primary Examiner* — Stephen F. Gerrity
(74) *Attorney, Agent, or Firm* — Fox Rothschild LLP

(57) ABSTRACT

A protective packaging formation device is provided herein. The device includes an inflation assembly having a fluid conduit that directs fluid between overlapping plies of a polymeric web. The device also includes a driving mechanism that drives the film in a downstream direction. The device also includes a sealing mechanism that includes a thin film heater that heats the plies to create a longitudinal seal that seals the plies of film together. The driving mechanism drives the web such that the web slides across the heating assembly in a downstream direction to trap fluid between the plies.

25 Claims, 16 Drawing Sheets

Related U.S. Application Data

(60) Provisional application No. 62/315,518, filed on Mar. 30, 2016.

(51) Int. Cl.
    *B29C 65/00*          (2006.01)
    *B29C 65/78*          (2006.01)
    *B29L 31/00*          (2006.01)

(52) U.S. Cl.
    CPC .......... *B29C 65/225* (2013.01); *B29C 65/228* (2013.01); *B29C 65/229* (2013.01); *B29C 65/7894* (2013.01); *B29C 66/0044* (2013.01); *B29C 66/1122* (2013.01); *B29C 66/133* (2013.01); *B29C 66/221* (2013.01); *B29C 66/223* (2013.01); *B29C 66/225* (2013.01); *B29C 66/439* (2013.01); *B29C 66/81457* (2013.01); *B29C 66/81465* (2013.01); *B29C 66/83411* (2013.01); *B29C 66/83413* (2013.01); *B29C 66/83415* (2013.01); *B29C 66/431* (2013.01); *B29C 66/8122* (2013.01); *B29L 2031/7138* (2013.01); *B31D 2205/0023* (2013.01)

(58) Field of Classification Search
    CPC ... B29C 65/228; B29C 65/229; B29C 66/439; B29L 2031/7138
    USPC ........................................ 53/79, 284.7, 374.3
    See application file for complete search history.

(56) References Cited

U.S. PATENT DOCUMENTS

| | | | |
|---|---|---|---|
| 3,253,122 A | 5/1966 | Kochmer et al. | |
| 3,614,383 A | 10/1971 | Watts, Jr. | |
| 5,282,349 A | 2/1994 | Siegel | |
| 5,376,219 A | 12/1994 | Sperry et al. | |
| 6,605,169 B2 | 8/2003 | Perkins et al. | |
| 6,751,926 B1 | 6/2004 | Cooper | |
| 6,789,371 B1 | 9/2004 | Buysman et al. | |
| 8,061,110 B2 | 11/2011 | Wetsch | |
| 8,128,770 B2 | 3/2012 | Wetsch et al. | |
| 2004/0216429 A1 | 11/2004 | Tanaka et al. | |
| 2006/0090421 A1 | 5/2006 | Sperry et al. | |
| 2007/0011989 A1 | 1/2007 | Sperry et al. | |
| 2007/0084842 A1 | 4/2007 | Sakamoto et al. | |
| 2008/0250753 A1 | 10/2008 | Sperry et al. | |
| 2008/0300121 A1* | 12/2008 | Selle et al. | B29C 66/80 493/189 |
| 2009/0094939 A1 | 4/2009 | Wetsch | |
| 2010/0263332 A1 | 10/2010 | Files et al. | |
| 2011/0155153 A1 | 6/2011 | Thorens et al. | |
| 2014/0284856 A1 | 9/2014 | Stay | |
| 2016/0176144 A1* | 6/2016 | Johnson et al. | B29C 65/18 493/193 |
| 2017/0339750 A1 | 11/2017 | Schall et al. | |

FOREIGN PATENT DOCUMENTS

| | | |
|---|---|---|
| EP | 2698240 A1 | 2/2014 |
| FR | 2182587 A1 | 12/1973 |
| JP | S57193604 U | 12/1982 |
| JP | 63203320 | 8/1988 |
| JP | H10194218 A | 7/1998 |
| JP | 2009004232 A | 1/2009 |
| WO | 0185434 A2 | 11/2001 |
| WO | 2017173140 A1 | 10/2017 |

OTHER PUBLICATIONS

Wang, Guangzu, Manufacturing and Application Technologies of Super Hard Material, p. 407, Zheng Zhou University Press, the first edition, Sep. 30, 2013.

\* cited by examiner

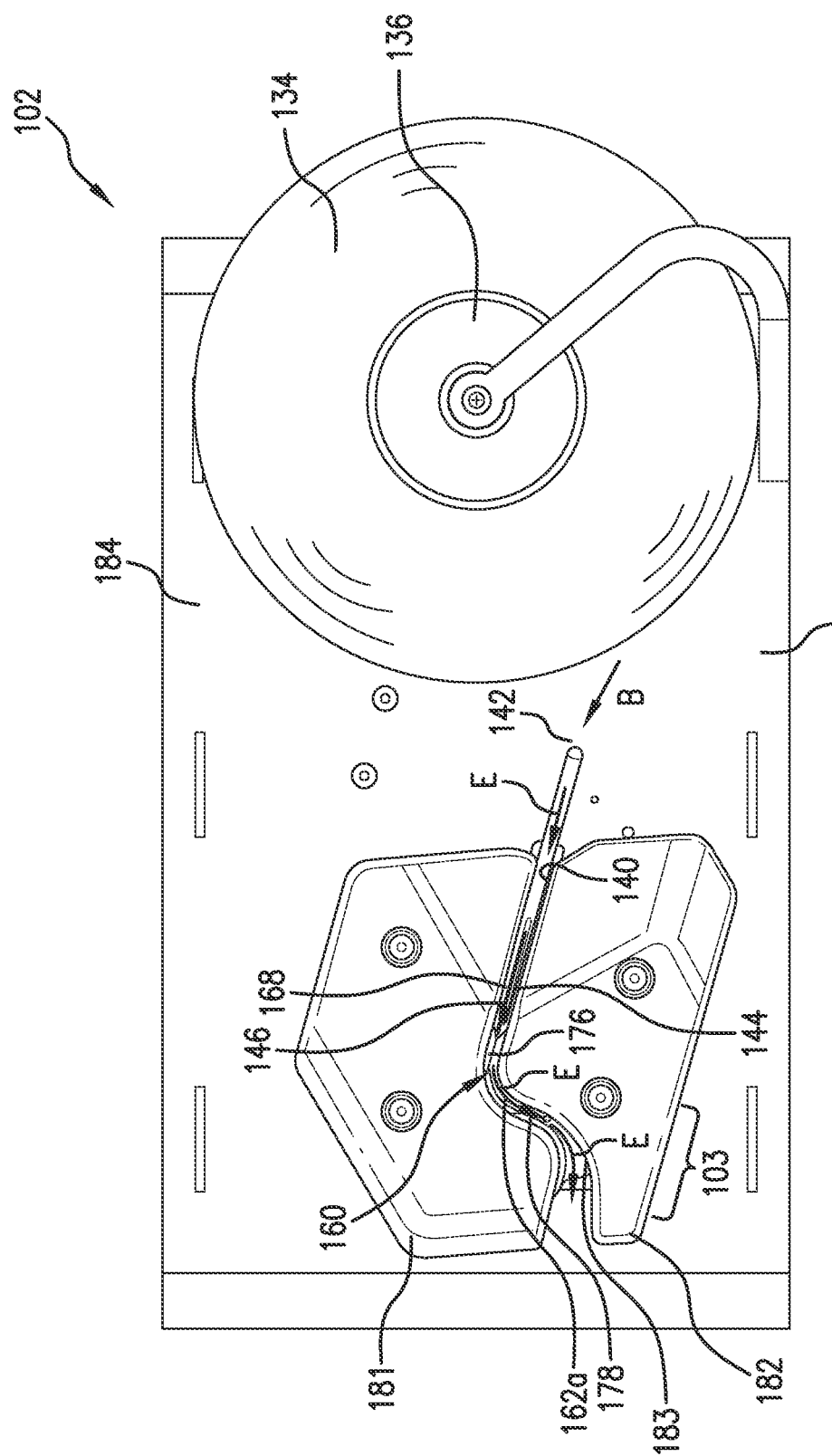

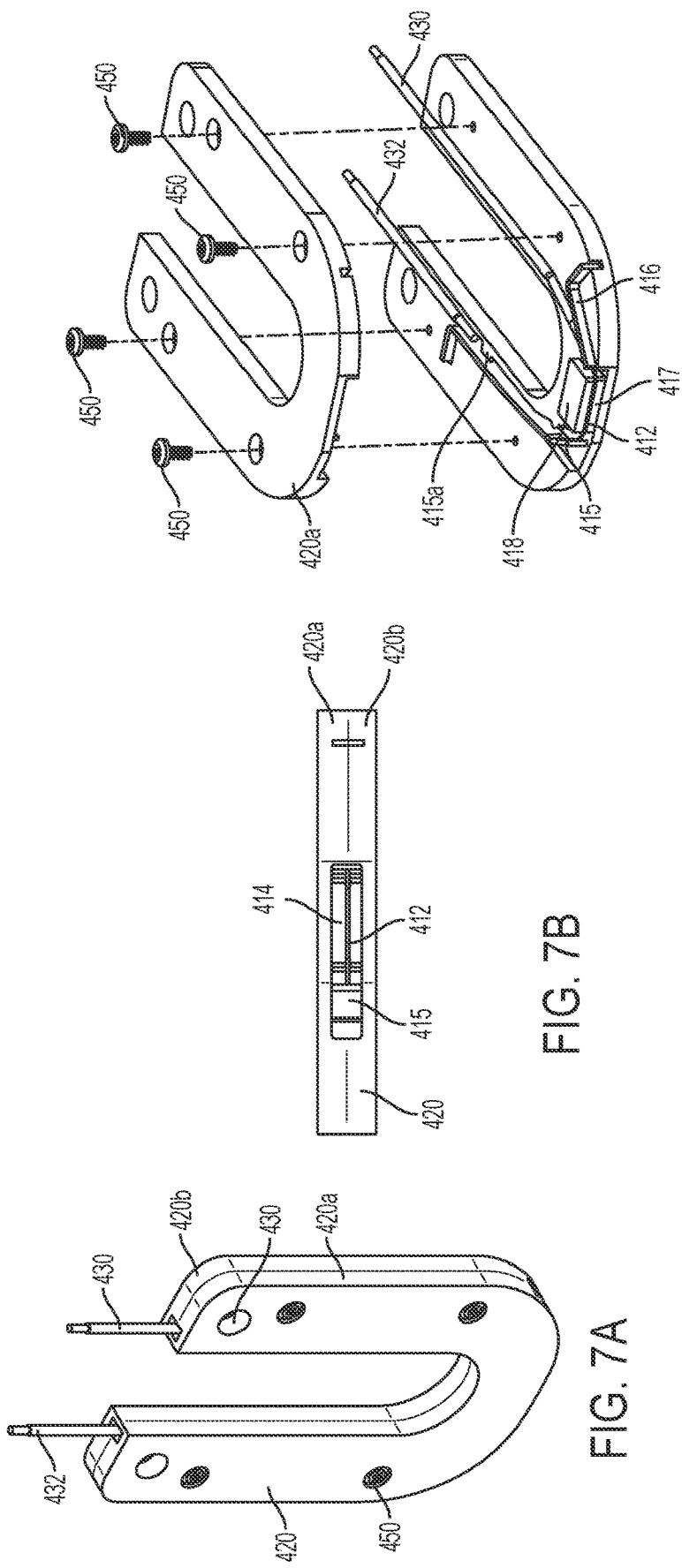

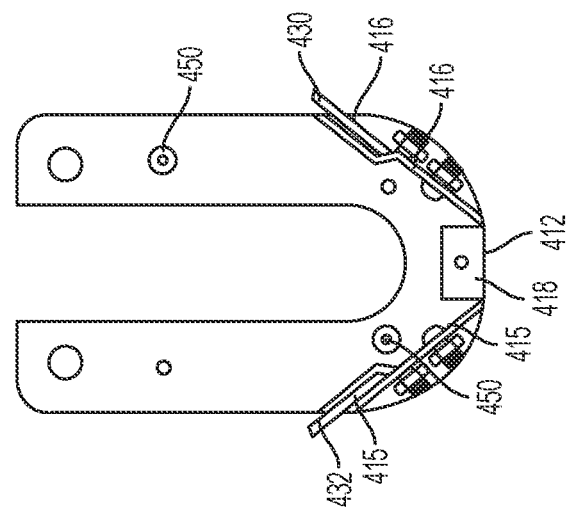
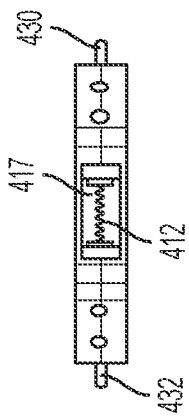
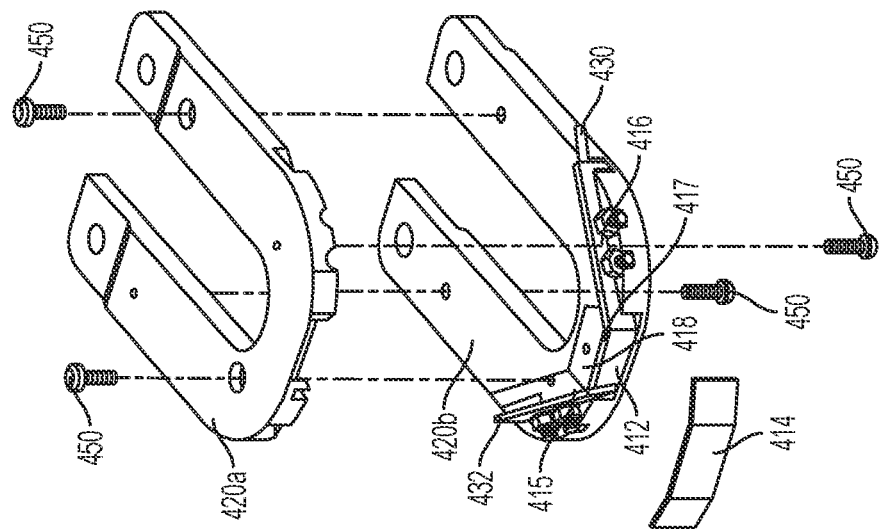

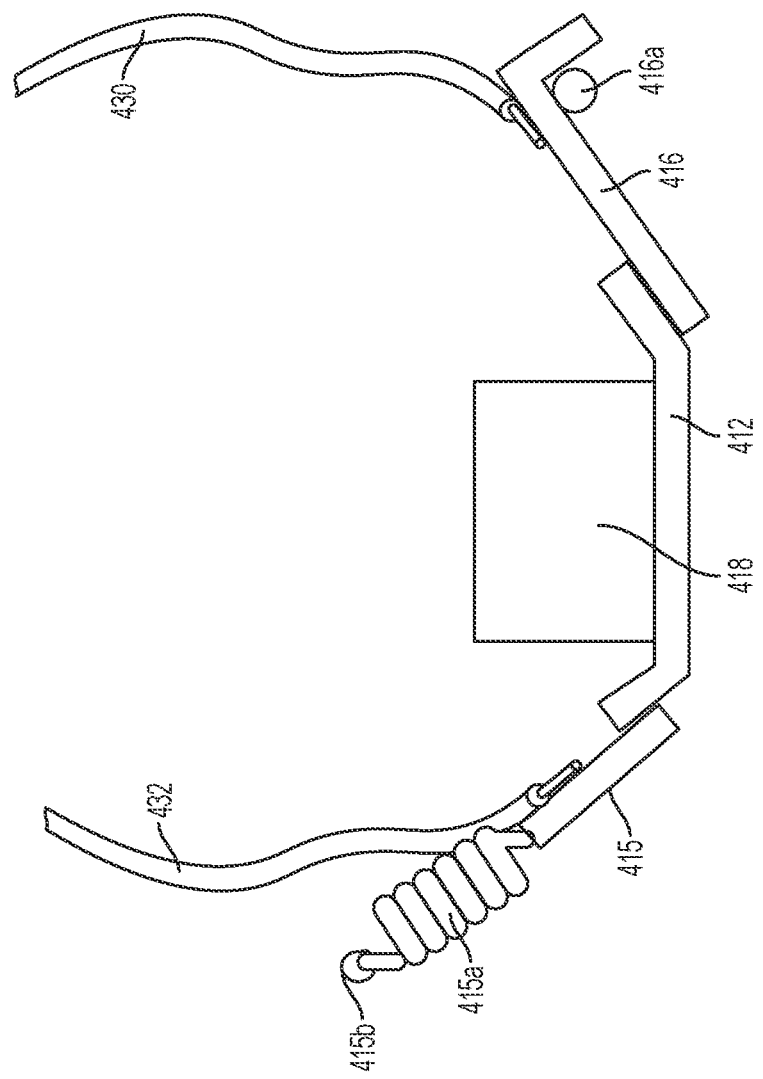

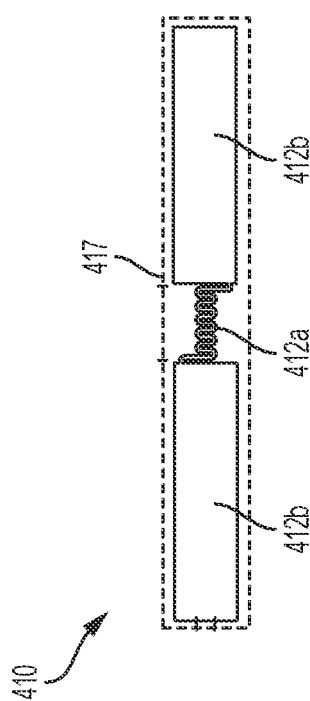
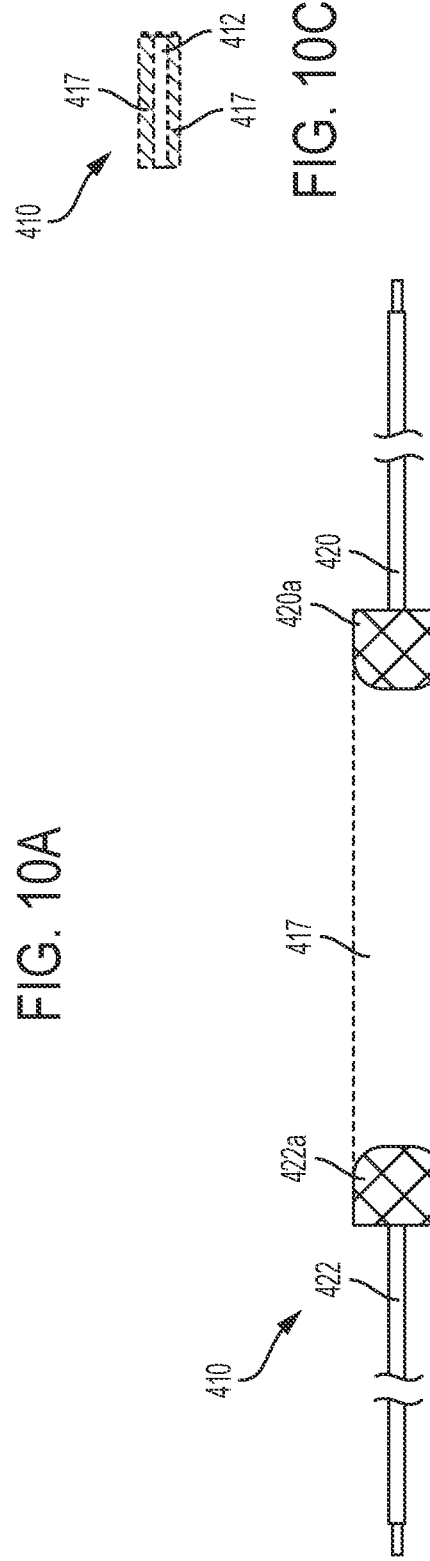

PROTECTIVE PACKAGING LONGITUDINAL HEAT SEALER

CROSS REFERENCE TO RELATED APPLICATION

This application is continuation of U.S. patent application Ser. No. 15/474,839, filed Mar. 30, 2017, which claims priority to U.S. Provisional Patent Application No. 62/315,518, entitled "Heat Sealer" and filed on Mar. 30, 2016, which are herein incorporated by reference in their entirety.

TECHNICAL FIELD

The present disclosure relates to packaging materials. More particularly, the present disclosure is directed to devices and methods for manufacturing inflatable cushions to be used as packaging material.

BACKGROUND

A variety of inflated cushions are well known and used for sundry packaging applications. For example, inflated cushions are often used as void-fill packaging in a manner similar to or in place of foam peanuts, crumpled paper, and similar products. Also for example, inflated cushions are often used as protective packaging in place of molded or extruded packaging components. Generally, inflated cushions are formed from films having two plies that are joined together by seals. The seals can be formed simultaneously with inflation, so as to capture air therein, or prior to inflation to define a film configuration having inflatable chambers. The inflatable chambers can be inflated with air or another gas and thereafter sealed to inhibit or prevent release of the air or gas.

In the process of inflating and sealing the chambers, the films are sealed by a variety of heating apparatuses. Some apparatuses include heating elements that move with the various members of the drive members. For example, a driving drum or belt includes a heating element that moves with the drum or belt. Additionally, the heating apparatuses frequently do not have adequate adjustment mechanisms to allow them to adapt to changes in temperature. Thus as the temperatures increase, the geometries of the heating apparatuses change causing changes in the way the heating apparatuses seal the material. Thus, improvements in these systems are desirable.

SUMMARY

In accordance with various embodiments a protective packaging formation device includes an inflation assembly having a fluid conduit that directs fluid between overlapping plies of a polymeric web. The device also includes a driving mechanism that drives the film in a downstream direction. The device also includes a sealing mechanism that includes a thin film heater that heats the plies to create a longitudinal seal that seals the plies of film together. The driving mechanism drives the web such that the web slides across the heating assembly in a downstream direction to trap fluid between the plies.

In accordance with various embodiments, the heating assembly further comprises a low-friction layer positioned between the web and the thin film heater. The web directly engages against the heating assembly and moves across the low friction layer of the heating assembly. The thin film heater includes a first layer and a second layer. The thin film heater also includes a heating element sandwiched between the first and second layers. The first layer, the second layer, and the heating element are bonded to one another. The bonding material is polyimide.

In accordance with various embodiments, the thin film heater is stationary during operation relative to the driving mechanism and the polymeric web. The driving mechanism comprises a first compression element that compresses the web against the heating assembly. The first compression element is rotatable. The driving mechanism further comprises a second compression element positioned relative to the first compression element such that the web is compressed between the first compression element and the second compression element. The heating assembly contacts the web as the web moves with the web being compressed against the heating assembly by the first compression element and the second compression element. The second compression element comprises a first portion and a second portion, wherein the heating assembly is at least partially received between the first portion and the second portion. The first compression element and the second compression element are directly driven to move the web across the heating assembly.

In various embodiments, the heating assembly is configured to retain tension in the heating element during thermal expansion. The heating element has a waveform shape. In one example, the waveform shape is sinusoidal. In one example, the wave form shape is a square wave.

In accordance with various embodiments, a protective packaging formation device includes an inflation assembly having a fluid conduit that directs fluid between first and second overlapping plies of a polymeric web. The device also includes a driving mechanism that drives the film in a downstream direction. The device also includes a sealing mechanism that includes a heating element that heats the plies to create a longitudinal seal that seals the first and second plies of film together, trapping the fluid therebetween as the driving mechanism drives the web. The web slides across the heating assembly in a downstream direction. The heating element includes a spring tensioning mechanism that takes up the expansion of the heating element along the heating elements length such that the spring tensioning mechanism retains tension in the heating element during thermal expansion substantially maintaining a tension across the heating element.

In accordance with various embodiments, the heating element includes a stationary contact positioned on one side of the heating element and a spring loaded contact positioned on the other side of the heating element. In one example, the spring loaded contact is a leaf spring located in a heating element housing with a first end of the leaf spring anchored and a second end of the leaf spring free floating and bent to produce the desired tension in the heating element such that as the heating element expands under heat the leaf spring takes up the slack keeping the heating element in tension. In other example, the spring loaded contact is an extension spring located in a heating element housing with a first end of the extension spring anchored and a second end of the extension spring free floating and bent to produce the desired tension in the heating element such that as the heating element expands under heat the extension spring takes up the slack keeping the heating element in tension.

BRIEF DESCRIPTION OF THE DRAWINGS

FIGS. 3A-C is a perspective view, front view with covers, and front view without covers, respectively, of the inflation and sealing device in accordance with a second embodiment;

FIG. 7A is an isometric view of a heating assembly in accordance with one embodiment;

FIG. 7B is a bottom view of the heating assembly of FIG. 7A in accordance with one embodiment;

FIG. 7C is an exploded view of the heating assembly of FIG. 7A in accordance with one embodiment;

FIG. 8A is an exploded view of a heating assembly in accordance with one embodiment;

FIG. 8B is an front view of a lower portion of the heating assembly of FIG. 8A in accordance with one embodiment;

FIG. 8C is a bottom view of the heating assembly of FIG. 8A in accordance with one embodiment;

FIG. 9 is a schematic view of a heating assembly in accordance with one embodiment;

FIG. 10A is a schematic top view of a heating element in accordance with one embodiment;

FIG. 10B is a schematic top view of a heating element assembly of FIG. 10A in accordance with one embodiment; and FIG. 10C is a schematic side view of the heating element assembly of FIG. 10B in accordance with one embodiment.

DETAILED DESCRIPTION

The present disclosure is related to protective packaging and systems and methods for converting uninflated material into inflated cushions that may be used as cushioning or protection for packaging and shipping goods.

Figure 1:
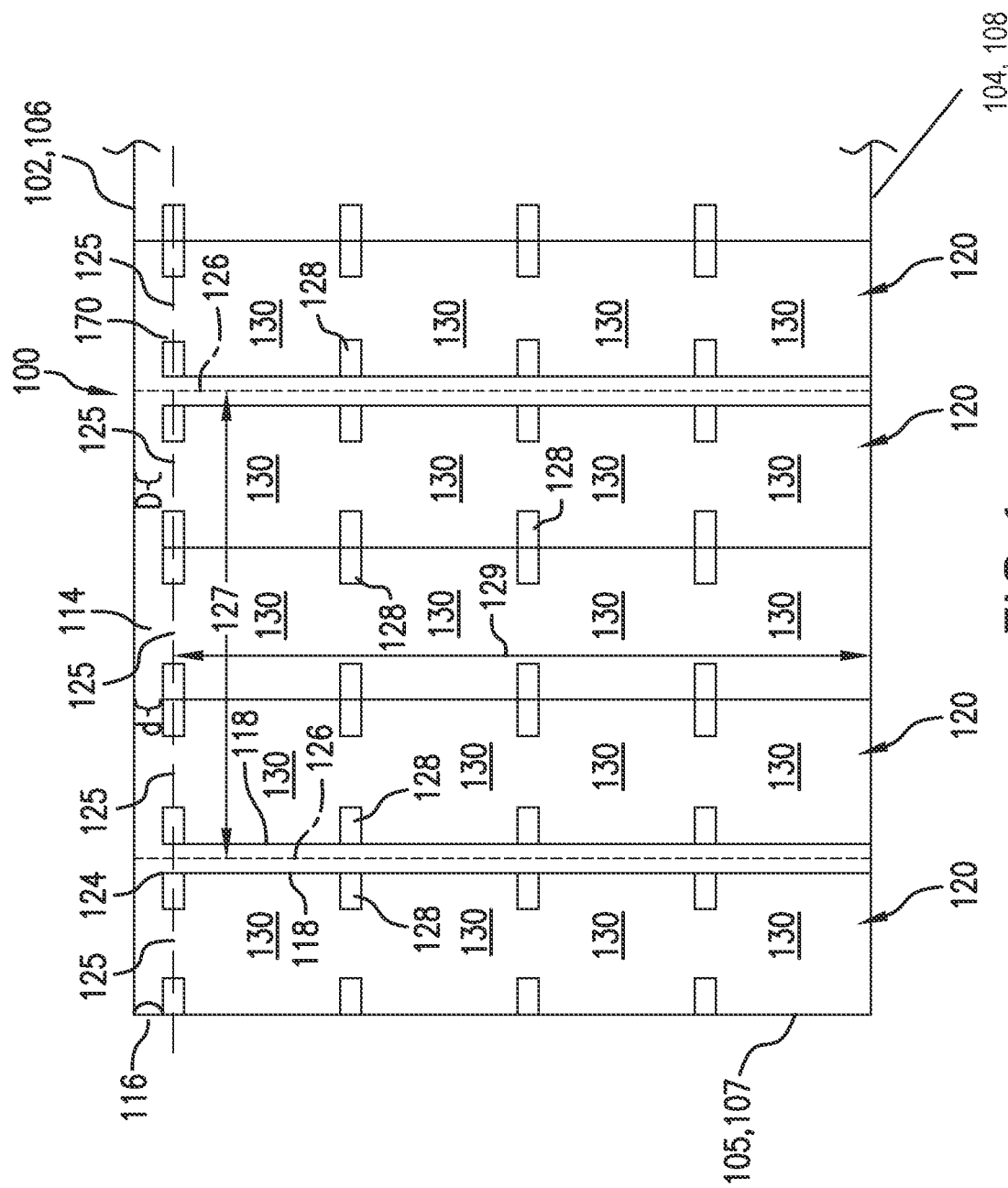
FIG. 1 is a top view of an uninflated material web according to an embodiment.

As shown in FIG. 1, a multi-ply flexible structure 100 for inflatable cushions is provided. The flexible structure 100 includes a first film ply 105 having a first longitudinal edge 102 and a second longitudinal edge 104, and a second film ply 107 having a first longitudinal edge 106 and a second longitudinal edge 108. The second ply 107 is aligned to be over lapping and can be generally coextensive with the first ply 105, i.e., at least respective first longitudinal edges 102, 106 are aligned with each other and/or second longitudinal edges 104, 108 are aligned with each other. In some embodiments, the plies can be partially overlapping with inflatable areas in the region of overlap.

FIG. 1 illustrates a top view of the flexible structure 100 having first and second plies 105, 107 joined to define a first longitudinal edge 110 and a second longitudinal edge 112 of the film 100. The first and second plies 105, 107 can be formed from a single sheet of flexible structure 100 material, a flattened tube of flexible structure 100 with one edge has a slit or is open, or two sheets of flexible structure 100. For example, the first and second plies 105, 107 can include a single sheet of flexible structure 100 that is folded to define the joined second edges 104, 108 (e.g., "c-fold film"). Alternatively, for example, the first and second plies 105, 107 can include a tube of flexible structure (e.g., a flatten tube) that is slit along the aligned first longitudinal edges 102, 106. Also, for example, the first and second plies 105, 107 can include two independent sheets of flexible structure joined, sealed, or otherwise attached together along the aligned second edges 104, 108.

The flexible structure 100 can be formed from any of a variety of web materials known to those of ordinary skill in the art. Such web materials include, but are not limited to, ethylene vinyl acetates (EVAs), metallocenes, polyethylene resins such as low density polyethylene (LDPE), linear low density polyethylene (LLDPE), and high density polyethylene (HDPE), and blends thereof. Other materials and constructions can be used. The disclosed flexible structure 100 can be rolled on a hollow tube, a solid core, or folded in a fan folded box, or in another desired form for storage and shipment.

As shown in FIG. 1, the flexible structure 100 can include a series of transverse seals 118 disposed along the longitudinal extent of the flexible structure 100. Each transverse seal 118 extends from the longitudinal edge 112 towards the inflation channel 114, and in the embodiment shown, toward the first longitudinal edge 110. Each transverse seal 118 has a first end 122 proximate the second longitudinal edge 112 and a second end 124 spaced a transverse dimension d from the first longitudinal edge 110 of the film 110. A chamber 120 is defined within a boundary formed by the longitudinal seal 112 and pair of adjacent transverse seals 118.

Each transverse seal 118 embodied in FIG. 1 is substantially straight and extends substantially perpendicular to the second longitudinal edge 112. It is appreciated, however, that other arrangements of the transverse seals 118 are also possible. For example, in some embodiments, the transverse seals 118 have undulating or zigzag patterns.

The transverse seals 118 as well as the sealed longitudinal edges 110, 112 can be formed from any of a variety of techniques known to those of ordinary skill in the art. Such techniques include, but are not limited to, adhesion, friction, welding, fusion, heat sealing, laser sealing, and ultrasonic welding.

An inflation region, such as a closed passageway, which can be a longitudinal inflation channel 114, can be provided. The longitudinal inflation channel 114, as shown in FIG. 1, is disposed between the second end 124 of the transverse seals 118 and the first longitudinal edge 110 of the film. Preferably, the longitudinal inflation channel 114 extends longitudinally along the longitudinal side 110 and an inflation opening 116 is disposed on at least one end of the longitudinal inflation channel 114. The longitudinal inflation channel 114 has a transverse width D. In the preferred embodiment, the transverse width D is substantially the same distance as the transverse dimension d between the longitudinal edge 101 and second ends 124. It is appreciated, however, that in other configurations, other suitable transverse width D sizes can be used.

The second longitudinal edge 112 and transverse seals 118 cooperatively define boundaries of inflatable chambers 120. As shown in FIG. 1, each inflatable chamber 120 is in fluid communication with the longitudinal inflation channel 114 via a mouth 125 opening towards the longitudinal inflation channel 114, thus permitting inflation of the inflatable chambers 120 as further described herein.

In one embodiment, the transverse seals 118 are further comprised of notches 128 that extend toward the inflatable chambers 120. As shown in FIG. 1, opposing notches 128 are aligned longitudinally along adjacent pairs of transverse seals 118 to define a plurality of chamber portions 130 within the inflatable chambers 120. The notches 118 create bendable lines that increase the flexibility of flexible structure 100 that can be easily bent or folded. Such flexibility allows for the film 100 to wrap around regular and irregular shaped objects. The chamber portions 130 are in fluid communication with adjacent chamber portions 130 as well as with the inflation channel 114. The notches can be any shape or size. In accordance with other embodiments, the transverse seals 118 are continuous, without interruptions from notches or the like.

A series of lines of weaknesses 126 is disposed along the longitudinal extent of the film and extends transversely across the first and second plies of the film 100. Each transverse line of weakness 126 extends from the second longitudinal edge 112 and towards the first longitudinal edge 110. Each transverse line of weakness 126 in the flexible structure 100 is disposed between a pair of adjacent chambers 120. Preferably, each line of weakness 126 is disposed between two adjacent transverse seals 118 and between two adjacent chambers 120, as depicted in FIG. 1. The transverse lines of weakness 126 facilitate separation of adjacent inflatable cushions 120.

The transverse lines of weakness 126 can include a variety of lines of weakness known by those of ordinary skill in the art. For example, in some embodiments, the transverse lines of weakness 126 include rows of perforations, in which a row of perforations includes alternating lands and slits spaced along the transverse extent of the row. The lands and slits can occur at regular or irregular intervals along the transverse extent of the row. Alternatively, for example, in some embodiments, the transverse lines of weakness 126 include score lines or the like formed in the flexible structure.

The transverse lines of weakness 126 can be formed from a variety of techniques known to those of ordinary skill in the art. Such techniques include, but are not limited to, cutting (e.g., techniques that use a cutting or toothed element, such as a bar, blade, block, roller, wheel, or the like) and/or scoring (e.g., techniques that reduce the strength or thickness of material in the first and second plies, such as electro magnetic (e.g., laser) scoring and mechanical scoring).

Preferably, the transverse width 129 of the inflatable chamber 120 is 3" up to about 40", more preferably about 6" up to about 30" wide, and most preferably about 12". The longitudinal length 127 between weakened areas 126 can be at least about 2" up to about 30", more preferably at least about 5" up to about 20", and most preferably at least about 6" up to about 10". In addition, the inflated heights of each inflated chamber 120 can be at least about 1" up to about 3", and most preferably about 6". It is appreciated that other suitable dimensions can be used.

Figure 2A:
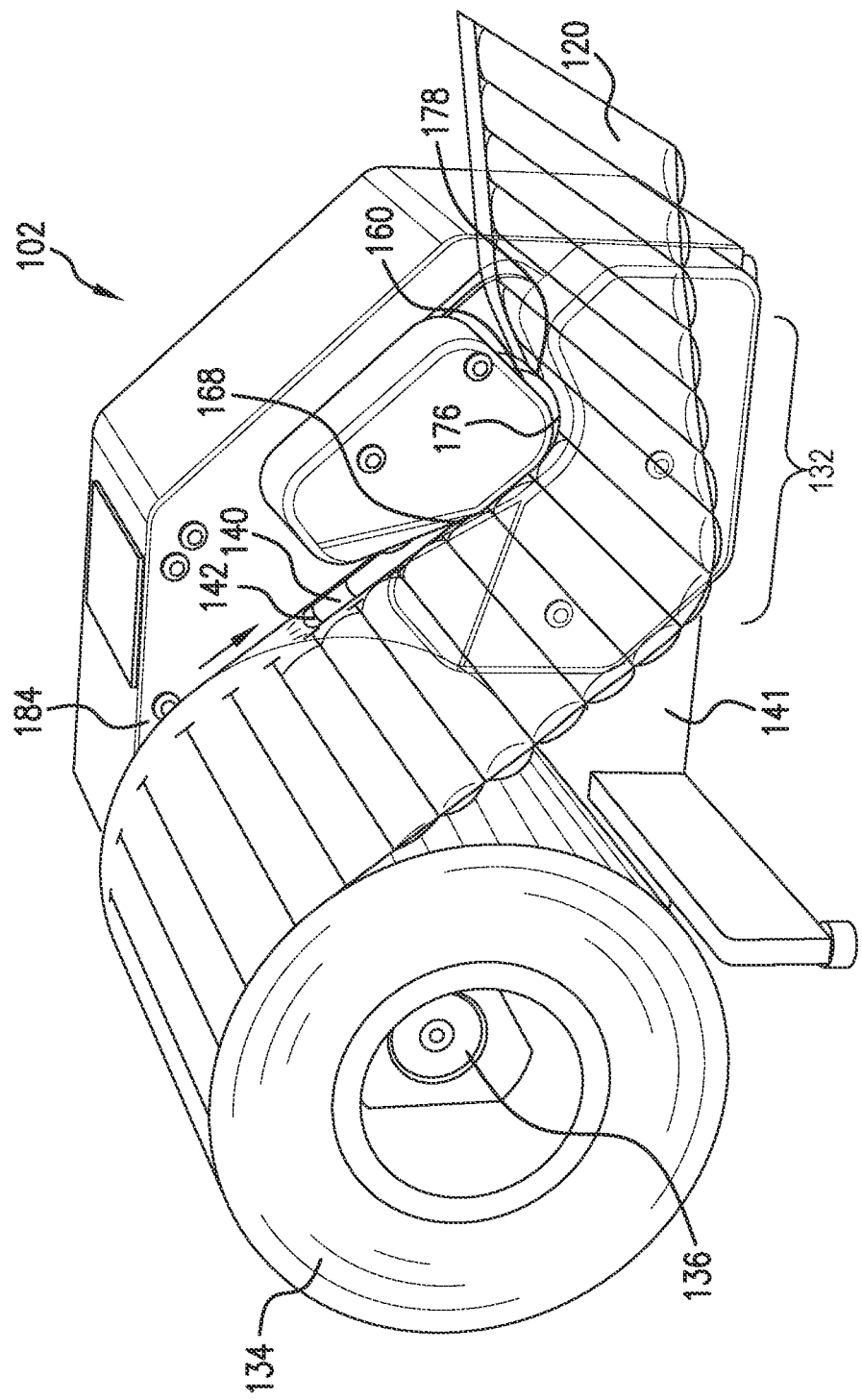
FIG. 2A-D is a perspective view, front view with covers, front view without covers, and side view, respectively, of the inflation and sealing device in accordance with a first embodiment.
Figure 2B:
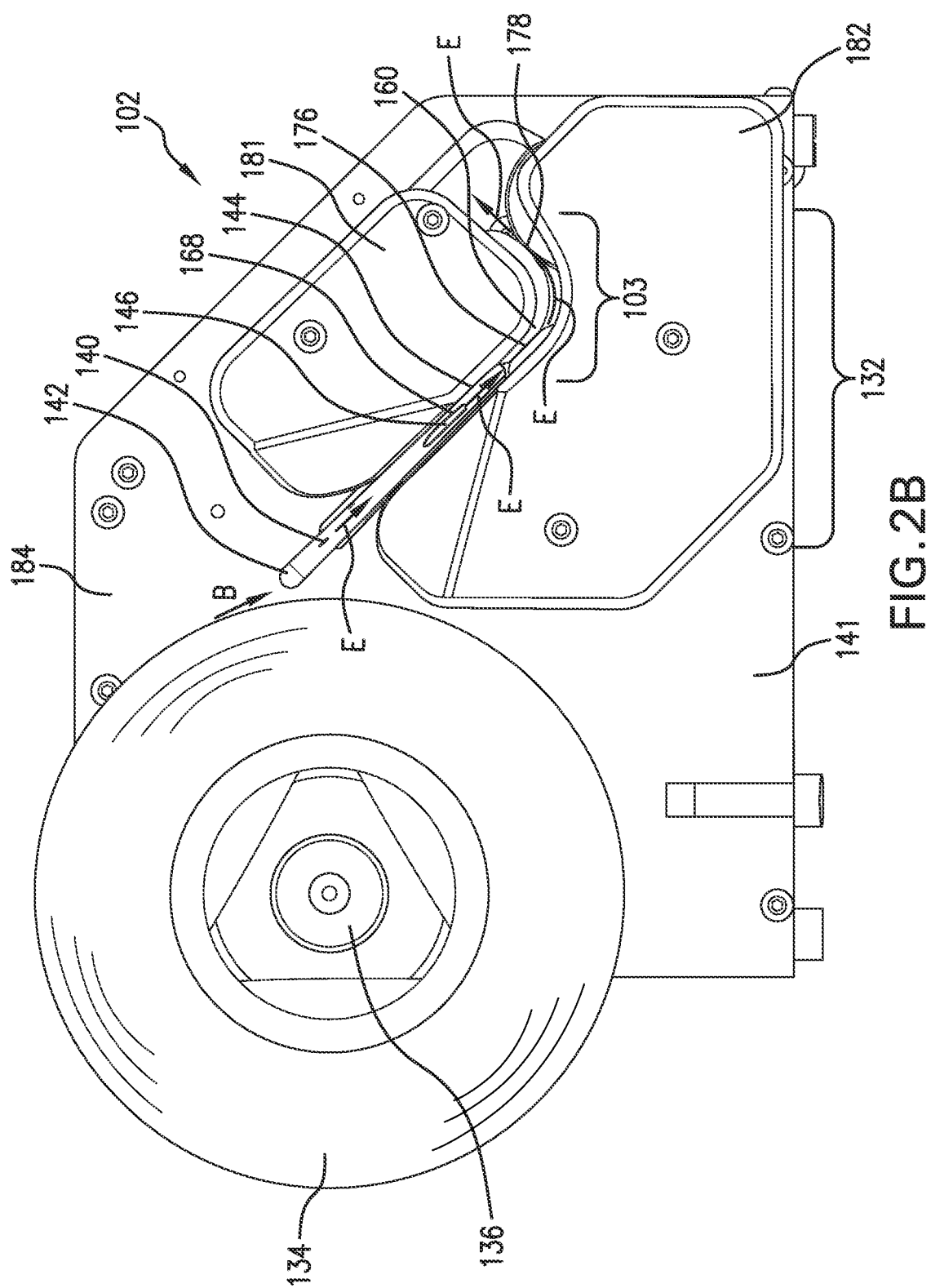
Figure 2C:
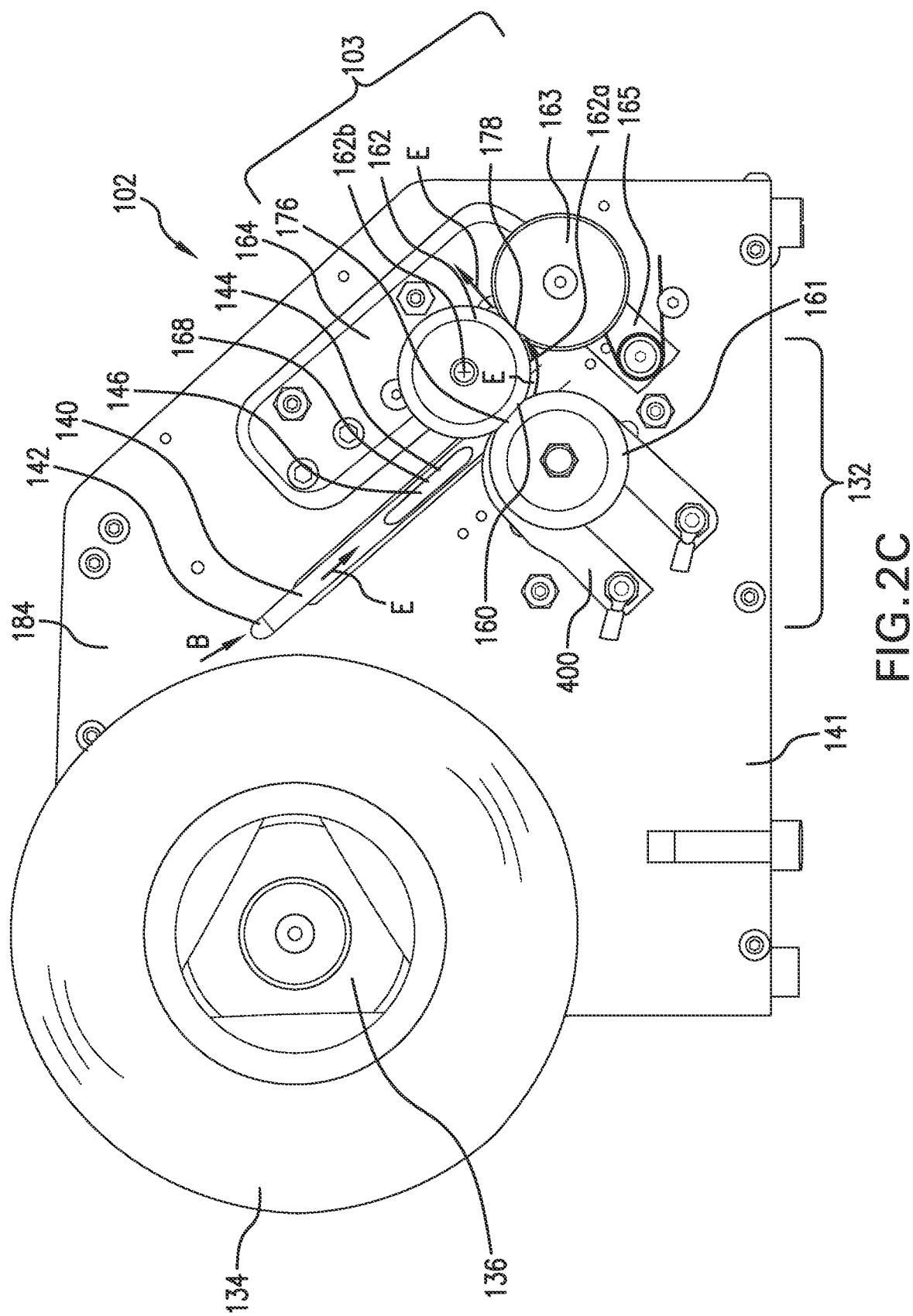

Turning now to FIGS. 2A-3C, an inflation and sealing device 102 for converting the flexible structure 100 of uninflated material into a series of inflated pillows or cushions 120 is provided. As shown in FIG. 2A, the uninflated flexible structure 100 can be a roll of material 134 provided on a roll axle 136. The roll axle 136 accommodates the center of the roll of web material 134. Alternative structures can be used to support the roll, such as a tray, fixed spindle or multiple rollers.

The flexible structure 100 is pulled by a drive mechanism. In some embodiments, intermediate members such as guide rollers can be positioned between roll 134 and the drive mechanism. For example, the optional guide roller can extend generally perpendicularly from a housing 141. The guide roller can be positioned to guide the flexible structure 100 away from the roll of material 134 and along a material path "B" along which the material is processed. In one example, the guide roller may be a dancer roller which may aid in controlling the material 134, such as keeping it from sagging between an inflation nozzle 140 and roll 134. In various embodiments, the stock material may advance downstream from the stock roll of material 134 without engaging a guide roll but may instead be advanced directly into an inflation and sealing assembly 132.

To prevent or inhibit bunching up of the web material 100 as it is unwound from the roll 134, the roll axle 136 can be provided with a brake to prevent or inhibit free unwinding of the roll 134 and to assure that the roll 134 is unwound at a steady and controlled rate. However, as discussed herein, other structures may be utilized in addition to or as an alternative to use of brakes, guide rollers, or web feed mechanisms in order to guide the flexible structure 100 toward a pinch area 176 which is part of the sealing mechanism 103. As indicated, because the flexible structure 100 may sag, bunch up, drift along the guide roller 138, shift out of alignment with the pinch zone 176, alternate between tense and slack, or become subject to other variations in delivery, the inflation and sealing assembly 132 may need suitable adjustability to compensate for these variations. For example, a nozzle 140 may be at least partially flexible, allowing the nozzle 140 to adapt to the direction the flexible structure 100 approaches as the structure is fed towards and over the nozzle 140, thereby making the nozzle 140 operable to compensate for or adapt to variations in the feed angle, direction, and other variations that the flexible structure 100 encounters as it is fed towards and over the nozzle 140.

The inflation and sealing device 102 includes an inflation and sealing assembly 132. Preferably, the inflation and sealing assembly 132 is configured for continuous inflation of the flexible structure 100 as it is unraveled from the roll 134. The roll 134, preferably, comprises a plurality of chain of chambers 120 that are arranged in series. To begin manufacturing the inflated pillows from the web material 100, the inflation opening 116 of the flexible structure 100 is inserted around an inflation assembly, such as an inflation nozzle 140, and is advanced along the material path "E". In the embodiment shown in FIGS. 2A-3C, preferably, the flexible structure 100 is advanced over the inflation nozzle 140 with the chambers 120 extending transversely with respect to the inflation nozzle 140 and side outlets 146. The side outlets 146 may direct fluid in a transverse direction with respect to a nozzle base 144 into the chambers 120 to inflate the chambers 120 as the flexible structure 100 advanced along the material path "E" in a longitudinal direction. The inflated flexible structure 100 is then sealed by the sealing assembly 103 in the sealing area 174 to form a chain of inflated pillows or cushions.

Figure 6:
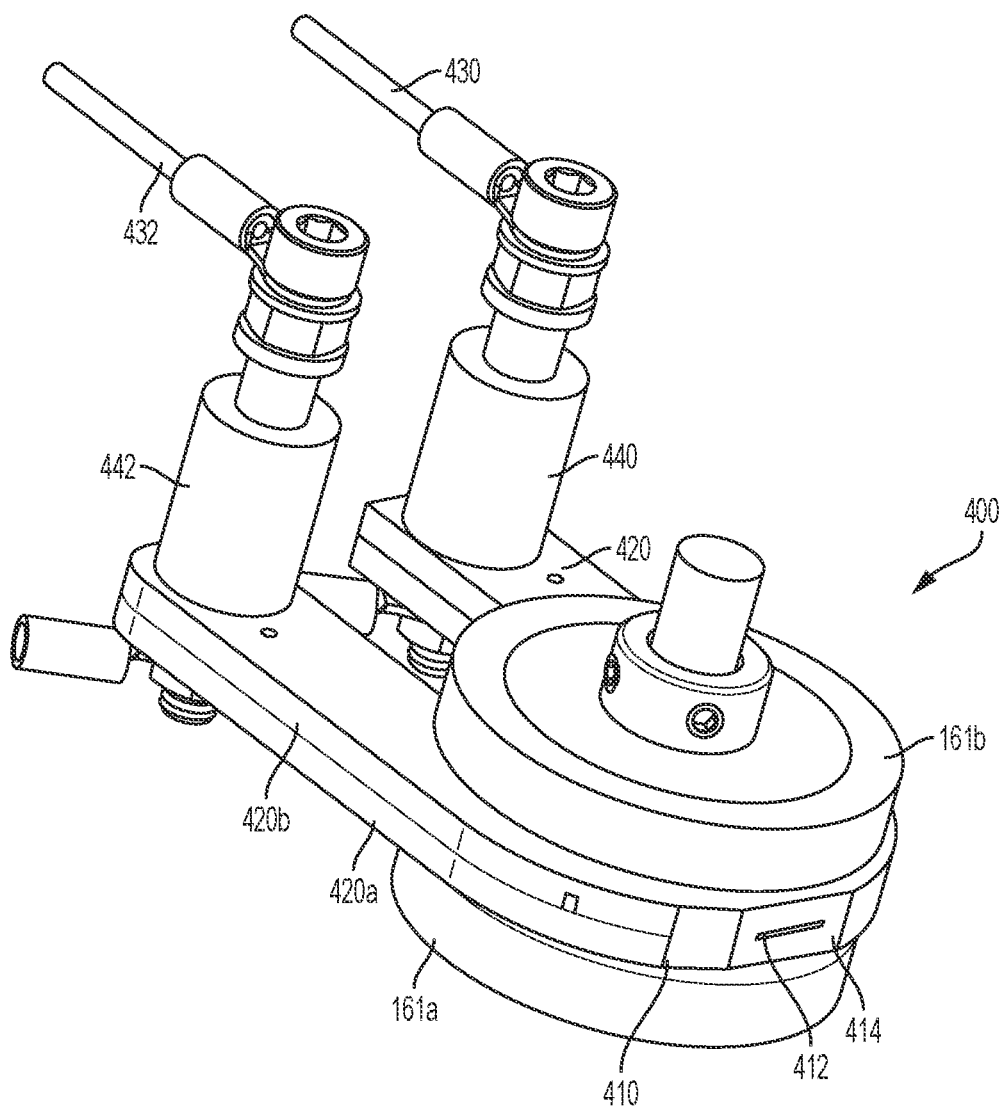
FIG. 6 is an isometric view of a heating assembly in accordance with one embodiment.

The side inflation area 168 is shown as the portion of the inflation and sealing assembly along the path "E" adjacent the side outlets 146 in which air from the side outlets 146 can inflate the chambers 120. In some embodiments, the inflation area 168 is the area disposed between the inflation tip 142 and pinch area 176. The flexible structure 100 is inserted around the inflation nozzle 140 at the nozzle tip 142, which is disposed at the forward most end of the inflation nozzle 140. The inflation nozzle 140 inserts a fluid, such as pressured air, into the uninflated flexible structure 100 material through nozzle outlets, inflating the material into inflated pillows or cushions 120. The inflation nozzle 140 can include a nozzle inflation channel 143 therethrough, as shown for example in FIGS. 6A and 6D, that fluidly connects a fluid source, which enters at a fluid inlet 143a, with one or more nozzle outlets (e.g. side outlet 146). It is appreciated that in other configurations, the fluid can be other suitable pressured gas, foam, or liquid. The nozzle may have an elongated portion, which may include one or more of a nozzle base 144, a flexible portion 142a, and a tip 142. The elongated portion may guide the flexible structure to a pinch area 176. At the same time the nozzle may inflate the flexible structure through one or more outlets. The one or more outlets may pass from the inflation channel 143 out of one or more of the nozzle base 144 (e.g. outlet 146), the flexible portion 142a, or the tip 142. The inflation nozzle 140 may extend away from the front surface of the device by an angle θ. In one example, Angle θ is between ½ and 2°. In a more particular example, Angle θ is between 1 and 1½°. Preferably, Angle θ is 1¼°

Figure 4A:
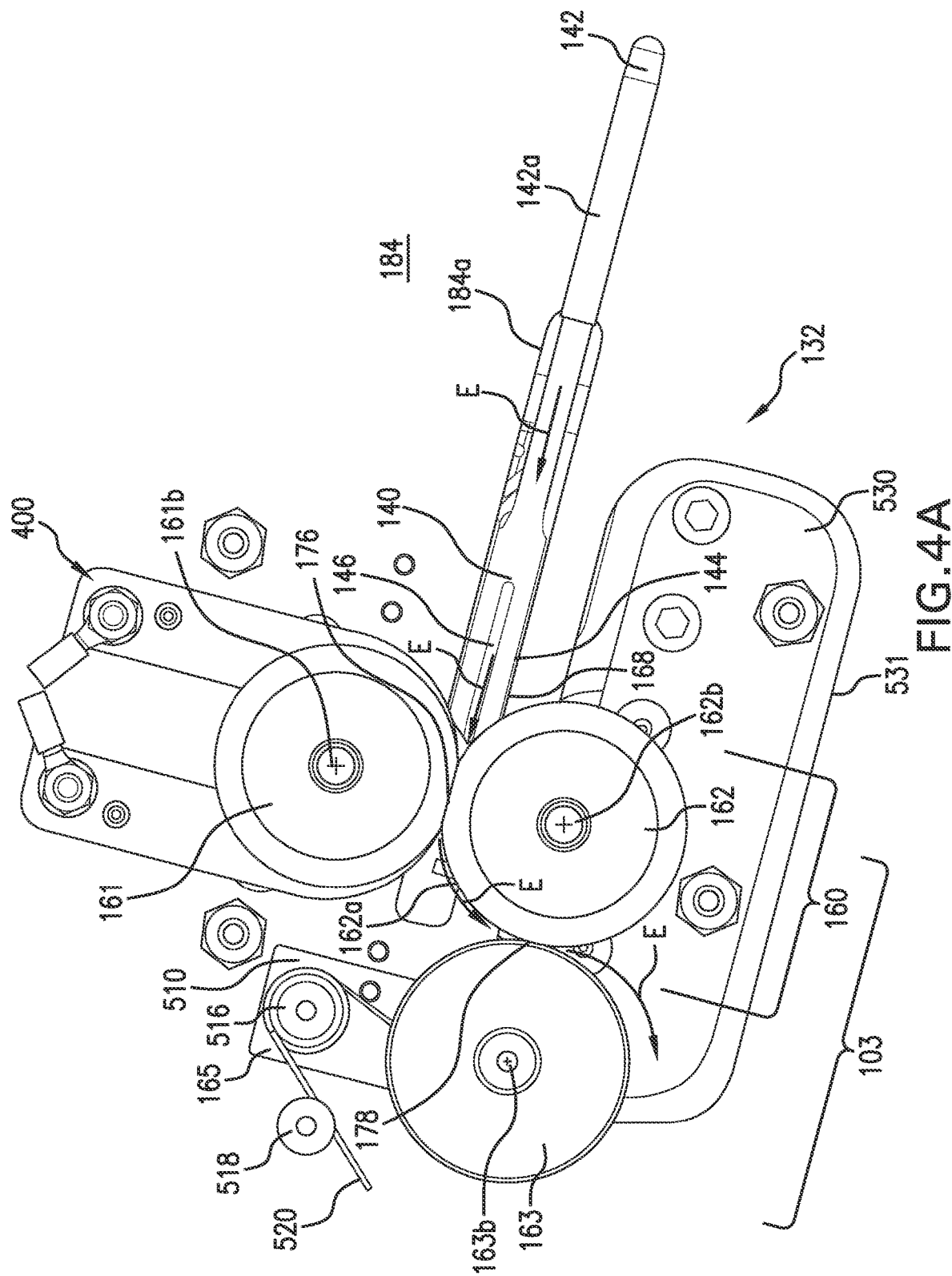
FIG. 4A is a detailed front view without covers of the inflation and sealing assembly in accordance with various embodiments.
Figure 4B:
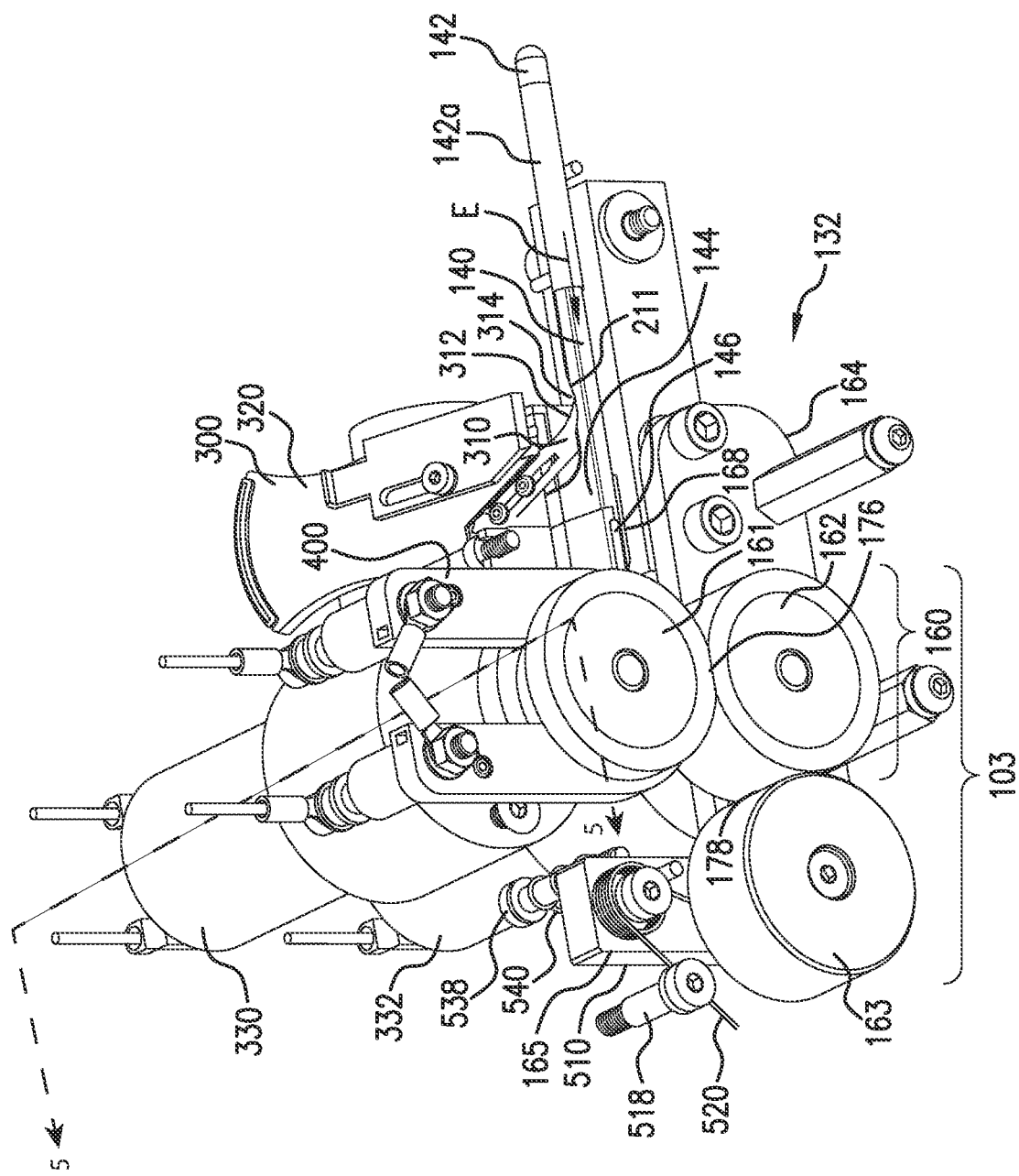
FIG. 4B is a front perspective view without covers of the inflation and sealing assembly in accordance with various embodiments.

As shown in FIG. 4A-B, the side outlet 146 can extend longitudinally along the nozzle base 144 toward a longitudinal distance from the inflation tip 142. In various embodiments, the side outlet 146 originates proximate, or in some configurations, overlapping, the sealer assembly such that the side outlet 146 continues to inflate the inflatable chambers 120 about right up to the time of sealing. This can maximize the amount of fluid inserted into the inflatable chambers 120 before sealing, and minimizes the amount of dead chambers, i.e., chambers that do not have sufficient amount of air. Although, in other embodiments, the slot outlet 146 can extend downstream past the entry pinch area 176 and portions of the fluid exerted out of the outlet 146 is directed into the flexible structure 100. As used herein, the terms upstream and downstream are used relative to the direction of travel of the flexible structure 100. The beginning point of the web is upstream and it flows downstream as it is inflated, sealed, cooled and removed from the inflation and sealing device.

The length of the side outlet 146 may be a slot having a length that extends a portion of the inflation nozzle 140 between the tip 142 and the entry pinch area 176. In one example, the slot length may be less than half the distance from the tip 142 to the entry pinch area 176. In another example, the slot length may be greater than half the distance from the tip 142 to the pinch area 176. In another example, the slot length may be about half of the distance from the tip 142 to the pinch area 176. The side outlet 146 can have a length that is at least about 30% of the length of the inflation nozzle 140, for example, and in some embodiments at least about 50% of the length of the inflation nozzle 140, or about 80% of the length 169 of the inflation nozzle 140, although other relative sizes can be used. The side outlet 146 expels fluid out the lateral side of the nozzle base 144 in a transverse direction with respect to the inflation nozzle 140 through the mouth 125 of each of the chambers 120 to inflate the chambers 120 and chamber portions 130.

The flow rate of the fluid through the nozzle 140 is typically about 2 to 15 cfm, with an exemplary embodiment of about 3 to 5 or cfm. The exemplary embodiment is with a blower 700 rated at approximately 14-20 cfm. But much higher blow rates can be used, for example, when a higher flow rate fluid source is used, such as, a blower 700 with a flow rate 1100 cfm.

The nozzle 140 may further include a portion with a fixed longitudinal axis X and a portion with a movable longitudinal axis Y. The nozzle 140 may further include a flexible portion 142a which allows the nozzle 140 to be adjustable relative to the travel path "E" of the flexible structure 100. As the flexible structure 100 approaches and the inflation opening 116 engages the tip 142, the flexible core 147 may deflect and adapt to the orientation of the inflation opening 116 such that the inflation channel 114 slides more easily over the nozzle 140. Similarly, if during operation the flexible structure 100 drifts out of alignment, the flexible core 147 may deflect and adapt to the orientation of the inflation channel 114. The tip of the inflation nozzle can be used to pry open and separate the plies in an inflation channel at the tip as the material is forced over the tip. For example, when the web is pulled over traditional inflation nozzles, the tip of the traditional inflation nozzles forces the plies to separate from each other A longitudinal outlet may be provided in addition to or in the absence of the lateral outlet, such as side outlet 146, which may be downstream of the longitudinal outlet and along the longitudinal side of the nozzle wall of the nozzle base 144 of the inflation nozzle 140.

FIGS. 2A-4B illustrate a side view of the inflation and sealing assembly 132. As shown, the fluid source can be disposed behind a housing plate 184 or other structural support for the nozzle and sealing assemblies, and preferably behind the inflation nozzle 140. The housing plate 184 includes a sealing and inflation assembly opening 184a as shown in FIG. 4A. The fluid source is connected to and feeds the fluid inflation nozzle conduit 143. The flexible structure 100 is fed over the inflation nozzle 140, which directs the web to the inflation and sealing assembly 132.

While various examples are described herein and shown in the FIGS. 2A-4D, it should be appreciated that these examples should not be limiting and that the nozzle 140 and inflation assembly may be configured in accordance with any known embodiments or developed embodiments that may benefit from the disclosure herein as a person of ordinary skill in the art could apply based on the disclosure herein.

The flexible structure 100 is advanced or driven through the inflation and sealing assembly 132 by a drive mechanism 160. The drive mechanism 160 includes one or more devices operable to motivate the flexible structure through the system. For example, the drive mechanism includes one or more motor driven rollers operable to drive the flexible material 100 in a downstream direction along a material path "E". One or more of the rollers or drums are connected to the drive motor such that the one or more rollers drive the system. In accordance with various embodiments, the drive mechanism 160 drives the flexible structure 100 without a belt contacting the flexible structure. In one example, the entire system is beltless. In another example, the system has a belt on drive elements that do not come into contact with the flexible structure 100. In another example, the system has a belt on some drive elements but not others. In other example, the system may have belts interwoven throughout the rollers allowing the material to be driven through the system by the belts. For example, U.S. Pat. No. 8,128,770 discloses a system that utilizes belts and rollers to control the inflation and sealing of cushions and the disclosure provided herein may be utilized with such a system.

In each of these systems for drive mechanisms, the sealing assembly 132 also includes a heating assembly 400 operable to seal the different layers of the flexible structure 100 to one another. While the various examples discussed herein are directed to rollers, a person of ordinary skill in the art will appreciate, based on the disclosure herein, that it is possible to use the various embodiments of the heating assembly 400 with other types of drive systems such as belt drive systems.

In accordance with various embodiments, the sealing assembly 132 includes the drive mechanism 160. The drive mechanism 160 includes at least one compression element 162. The at least one compression element 162 may include a curved surface 162a that is operable to bend the web about a bend axis 162b. The drive mechanism 160 includes another compression element 161 that is positioned adjacent to the compression element 162. The compression element 161 is positioned relative to the compression element 162 such that the two compression elements 161, 162 together are operable to receiving the flexible material 100 at a pinch area 176. The pinch area 176 is defined by the area in which the compression element 161 and the compression element 162 are positioned against the flexible structure 100 to pinch the flexible structure 100 there between.

The drive mechanism 160 can also include another compression element 163. The compression element 163 is also positioned adjacent to the compression element 162. The relationship between the compression element 163 and the compression element 162 is such that the two compression elements 162, 163 form a second pinch 178 area in which the compression element 163 and the compression 162 element contact the contact and apply pressure to the flexible material 100.

In accordance with various embodiments, the drive system forms a cooling path that is disposed downstream of the first pinch 160. In one example, the cooling path is defined by the curved surface 162a. The peripheral area the curved surface 162a along the compression element 162 forms a contact area that engages the flexible material directly. As discussed in more detail below, in some embodiments, the peripheral area is cylindrical and accordingly the peripheral area is the outer circumferential area of the cylinder. In other embodiments, the peripheral area is the outer area of the surface of the shape defining the compression element 162. In accordance with the various embodiments, the compression element 162 forms a path between pinch area 176 and pinch area 178 that allows the newly formed longitudinal seal 112 on the flexible material 100. The longitudinal seal 112 is formed by a heating assembly 400 that is a part of sealing assembly 132. The pinch area 178 holds the web sufficiently tight against the curved surface 162a of the compression element 162 to retain the fluid within the chamber 120 as the longitudinal seal 112 cools. Holding the longitudinal seal 112 against the cooling zone limits the stretching and deformation caused by the air pressure within the inflated chamber at the longitudinal seal 112. Absent the holding pressure caused by the pinch area 176 and 178 against the cooling zone along curved surface 162a, the effectiveness of the longitudinal seal 112 would be reduced due to the air pressure within the inflated chamber. In accordance with various embodiments, the cooling zone is sufficiently long to allow sufficient cooling of the longitudinal seal 112 to set in the seal such that the air pressure within the inflated chamber 120 does not stretch or deform the longitudinal seal 112 beyond the longitudinal seal's 112 ability to hold the air pressure therein. If the cooling zone is not sufficiently long such the longitudinal seal does not properly set. If the angle between the pinch area 176 and the pinch area 178 is too far the inflated material will wrap back on itself. Thus the location of the compression element 163 and the compression element 161 relative to one another around the curved surface 162a should be one that produces the best seal without allowing the flexible material to interfere with itself thereby providing a superior with longitudinal seals 112 that adequately hold the air.

In accordance with various embodiments, the pinch area 178 is located at an angle that is greater than 15° from the pinch area 176 as measured around axis 162a. In such an embodiment, the curvatures of the compression elements 161 and 163 are smaller than the radius of the curved area 162a of compression element 162. In various embodiments, the pinch area 178 is located at an angle that is at least or greater than 60° from the pinch area 176 as measured around axis 162a. In such an embodiment, the radius of the curvature of the compression elements 161 and 163 can be approximately the same radius as the curved area 162a of compression element 162. In other examples of this embodiment, the radius of the curvature of the compression elements 161 and 163 can be greater than the radius of the curved area 162a of compression element 162. In accordance with various embodiments, the pinch area 178 is located between 30° and 180° from the pinch area 176 as measured around axis 162a. In such embodiments, the curved surface 162a is cylindrical between the pinch area 176 and 178 with a radius of between.

In each of the above embodiments and examples, it should be appreciated that the pinch areas 176 and 178 are defined by the positions of the compression elements 161, 162 and 163 relative to each other. As such, the positions between compression elements 161 and 163 can be similarly defined by the angles there-between such that those positions create the relative locations of the pinch points discussed above.

In accordance with various embodiments, one or both of the compression elements 161 and 163 also have curved surfaces. In accordance with one example, all three compression elements 161, 162, and 163 are cylindrical. In a more particular example, one or more of the compression elements 161, 162, and 163 are rollers. These rollers can be nip rollers that pinch the flexible material 100. As such, in accordance with various examples, the compression element 161 can be a roller that forms the first pinch area 176 with the compression element 162 that is also a roller having an axis of ration about the axis 162b. Similarly, in the same example, the compression element 163 can be a roller that forms the second pinch area 178 with the compression element 162 that is also a roller having an axis of ration about the axis 162b. Under this example, the nip rollers 161 and 162 can pinch the flexible material 100 at pinch area 176 and drive the material to the pinch area 178 between nip rollers 163 and 162, while maintaining direct contact between the flexible material 100 and the outer circumference 162a of the nip roller 162.

In accordance with various embodiments, each of the compression elements may be variously adjustable relative to the other compression elements. Thus, the compression element 161 can be adjustable relative to at least one of compression elements 162 or 163. The compression element 162 can be adjustable relative to at least one of compression elements 161 or 163. The compression element 163 can be adjustable relative to at least one of compression elements 161 or 162. In a preferred embodiment, compression element 162 is stationary with one or more of compression elements 161 and 163 adjustable relative to the compression element 162. For example, the compression element 161 is adjustable relative to the compression element 162. In another example, the compression element 163 is adjustable relative to the compression element 162. In a third example, both the compression element 161 and 163 are adjustable relative to compression element 162. The adjustment of the various compression elements relative to one another is such that the adjustment forms a gap between each of the compression elements in an open state and removes the gap or forms a sufficiently small gap in a closed state so that the various compression elements pinch the flexible material 100 therebetween.

In accordance with various embodiments, one or more of the various compression elements 161, 162, and 163 can include an adjustment mechanism that allows the adjustment discussed above between the various compression elements 161, 162, and 163. The adjustment of the various compression elements 161, 162, and 163 relative to one another may be accomplished manually, mechanically, or a combination of the two. This adjustment can be rectilinear, curvilinear, or include any combinations of paths that allow controlled movement between the various compression elements.

In various examples and as illustrated in FIG. 4A-B, the compression element 163 is positioned on an adjustment mechanism 165. The adjustment mechanism 165 is a device that is operable to move the compression element 163 toward or away from another compression element such as compression element 162. This adjustment creates or decrease the gap discussed above so that the flexible material 100 can be fit into the gap and then pinched between compression elements 163 and 162. In various examples, the adjustment mechanism 165 includes a lever 510. The lever 510 is pivotable about an axis 512. For example, the lever 510 include a hole that mounts on a stud 516, with the stud 516 and the lever hole being coaxial at axis 512. The compression element 163 mounts coaxial with a second axis 163b positioned at a first distance from axis 512. The second axis 163b may be defined by the stud 514 which the compression element 163 may pivot around in embodiments in which the compression element 163 pivots. In accordance with various embodiments, the axis 512 is positioned such that rotation of the lever 510 about the axis 512 moves the compression element 163 generally radial to the compression element 162 at the pinch area 178.

In accordance with various embodiments, the compression element 163 is biased toward the compression element 162. For example, a biasing mechanism 520 biases the adjustment mechanism 165 towards the compression element 162 such that the compression element 163 is biased toward the compression element 162. In one particular example, the biasing mechanism 520 is a torsion spring positioned around stud 516 with a first end of the torsion spring engaging a stud 518 extending from the housing (e.g. the housing plate 184) and the second end of the torsion spring 520 engaging the lever 510. The torsion spring 520 is positioned in such a manner that the torsion spring 520 forces the end of the lever opposite the stud 516 toward the compression element 162. With the compression element 163 positioned on the end of the lever opposite the stud 516, the compression element 163 pivots about the axis 512 at the stud 516 and is forced against the compression element 162. The force exerted by the spring causes the compression element 163 and the compression element 162 to compress the flexible material therebetween under the force of the spring. While this example and the illustrated example in FIGS. 4A-B are directed to a torsion spring it may be appreciated that other biasing mechanisms may be used as well including coil springs, extension springs, a flexible lever, counterweights, or any device known or developed in the art.

In various examples and as illustrated in FIG. 4A-B, the compression element 162 is also or alternatively positioned on an adjustment mechanism such as adjustment mechanism 164. The adjustment mechanism 164 is a device that is operable to move the compression element 162 toward or away from another compression element such as compression element 162. This adjustment creates or decreases the gap discussed above so that the flexible material 100 can be fit into the gap and then pinched between compression elements 162 and 161. In various examples, the adjustment mechanism 164 includes a lever 530. Lever 530 can be made of a single integral structure or multiple connected structures such as those shown in FIGS. 4A-B. The lever 530 is pivotable about an axis 532. For example, the lever 530 includes a hole at a first end that mounts on a stud 536, with the stud 536 and the lever hole being coaxial at axis 532. The compression element 162 mounts coaxial with a second axis 162b positioned at a first distance from axis 532. In various embodiments, the compression element 162 does not mount directly to the lever 530 (either section 530a or 530b) but instead is positioned relative to the lever 530 at clearance 542. In one example, fasteners 544 mount a drive motor 332 (or gearbox, mounting bracket or the like) to the lever 530 and the compression element 162 is mounted to the drive motor 332 along the drive axis 162b. In accordance with various embodiments, the axis 532 is positioned such that rotation of the lever 530 about the axis 532 moves the compression element 162 generally tangential to the compression element 163 at the pinch area 178 and generally radially to the compression element 161 at the pinch area 176.

In accordance with various embodiments, the compression element 162 is biased toward the compression element 161. For example, a biasing mechanism 540 biases the adjustment mechanism 164 towards the compression element 161 such that the compression element 162 is biased toward the compression element 161. In one particular example, the biasing mechanism 540 incudes one or more extension springs positioned between a stud 539 and a stud 538. The stud 538 is mounted extending from the housing (e.g. the housing plate 184) and the stud 539 is mounted extending from the lever 530. In this way, the extension springs bias the stud 538 toward the stud 539. The extension springs 540 are positioned in such a manner that extension springs 540 forces the end of the lever opposite the stud 536 toward the compression element 161. With the compression element 162 positioned on the end of the lever 530 opposite the stud 536, the compression element 162 pivots about the axis 532 at the stud 536 and is forced against the compression element 161 and or the heating assembly 400. The force exerted by the biasing member 540 causes the compression element 162 and the compression element 161 to compress the flexible material 100 therebetween under the force of the biasing member 540. While this example and the illustrated example in FIGS. 4A-B are directed to extension springs it may be appreciated that other biasing mechanisms may be used as well including coil springs, torsion springs, a flexible lever, counterweights, or any device known or developed in the art suitable to biasing a mechanical system.

In accordance with one embodiment, the lever 530 may include bracket 530a and bracket 530b. The two brackets are connected to one another such that bracket 530a pivots about axis 532 behind plate 184, while bracket 530b pivots with at least one surface extending through or approximately flush with the plate 184. For example, plate 184 may have an opening 531 extending therethrough. Bracket 530b may extend partway through this opening 531 or all the way through the opening 531. In a preferred embodiment the front surface of bracket 530b is approximately flush with the front surface of plate 185 such that features extending from the front surface of bracket 530 extend from a surface that is generally in the same plane as features extending from the front surface of plate 185. It may also be appreciated that lever 530 may be made with as a single integrally formed lever with different front surfaces to operate in the manner described herein. In other embodiments, lever 530 may operate entirely behind, in front of, or in absence of plate 185.

In accordance with various embodiments, the adjustment mechanism 164 and the adjustment mechanism 165 may be engaged with each other such that when one adjustment mechanism is moved to create a gap or decrease a gap between compression elements, then the other adjustment mechanism is similarly moved to create a gap or decrease a gap between the compression elements. For example, as shown in FIG. 4C, lever 510 includes a concave notch 522 formed in the end of the lever opposite the pivot axis 512. One side of the notch 522 includes a ramp 524. The notch is sized sufficiently to allow a stud 548 to enter into the concave portion of the notch 522 and engage the ramp 524. In one example, the axis 163b is positioned between the notch 522 and the pivot axis 512. In accordance with various embodiments, the stud 548 extends from the lever 530 on an end of the lever opposite the pivot axis 532. As shown in FIG. 4C, as lever 530 is rotated clockwise, the stud 548 engages the ramp 524 creating a force in the lever 510 that would cause the lever to rotate clockwise as well. As the force that causes the lever 530 to rotate clockwise is released, both lever 530 and 510 are biased by their biasing members back to their original biased position. In this manner, when a user rotates lever 530, the pinch areas 176 and 178 between their respective compression elements are released forming gaps at these pinch areas. The gaps allow the flexible material 100 to be inserted or removed from the drive mechanism 160. It should be appreciated that the engagement between adjustment mechanisms 165 and 164 can be reversed such that adjustment mechanism of mechanism 165 automatically causes adjustment of mechanism 164, just the opposite of what is described above.

In accordance with various embodiments, one or more of the compression elements may be nip rollers as discussed above. Each of the nip rollers may be directly driven by a motor. In one example, nip roller 162 is directly driven by motor 332. In one example, nip roller 161 is directly driven by motor 330. In one example, both nip rollers 161, and 162 are directly driven by motors 330 and 332 respectively. In various embodiments nip roller may be driven alone, in combination with nip roller 16, in combination with nip roller 162, or in combination with both nip roller 161 and 162. In other embodiments, one motor may drive one or more of the nip rollers via a transmission such as a timing belt.

In accordance with various embodiments, the inflation and sealing device 102 may include one or more covers (e.g. 181 and 182) over the inflation and sealing assembly 132. The covers (e.g. 181 and 182) can be operable to redirect the web after the web exits the second pinch area 178. For example, the covers include a deflection surface 183 that contacts the flexible material 100 as it exits the pinch area 178 and separates the flexible material 100 from the compression elements 162 and 163 redirecting the flexible material 100 in any desired direction. The cover may be a harder material than the rollers and sufficiently smooth and continuous to have relatively little engagement or adhering tendency with the flexible material 100.

In accordance with a preferred embodiment, the heating assembly 400 is stationary. Examples of various heating assemblies and heating elements positioned stationary while the flexible material 100 and the drive mechanisms move relative to the heating assemblies and heating elements are depicted in FIGS. 2C, 3C, 4A, 4B, and 5, 6, 7A-C, 8A-C, 9, 10A-C. By positioning the heating assembly 400 so that the heating assembly 400 remains stationary while the flexible material 100 moves across the heating assembly 400, the entire seal is formed by the same section of heating assembly allowing for greater consistency in heating assembly temperature, positioning, and overall conditions, which in turn provides for consistent seals. The stationary position of the heating assembly 400 also allows for simplified construction of certain heating elements and or heating element tensioning mechanisms, which further improves the consistent application of the seals.

Figure 2D:
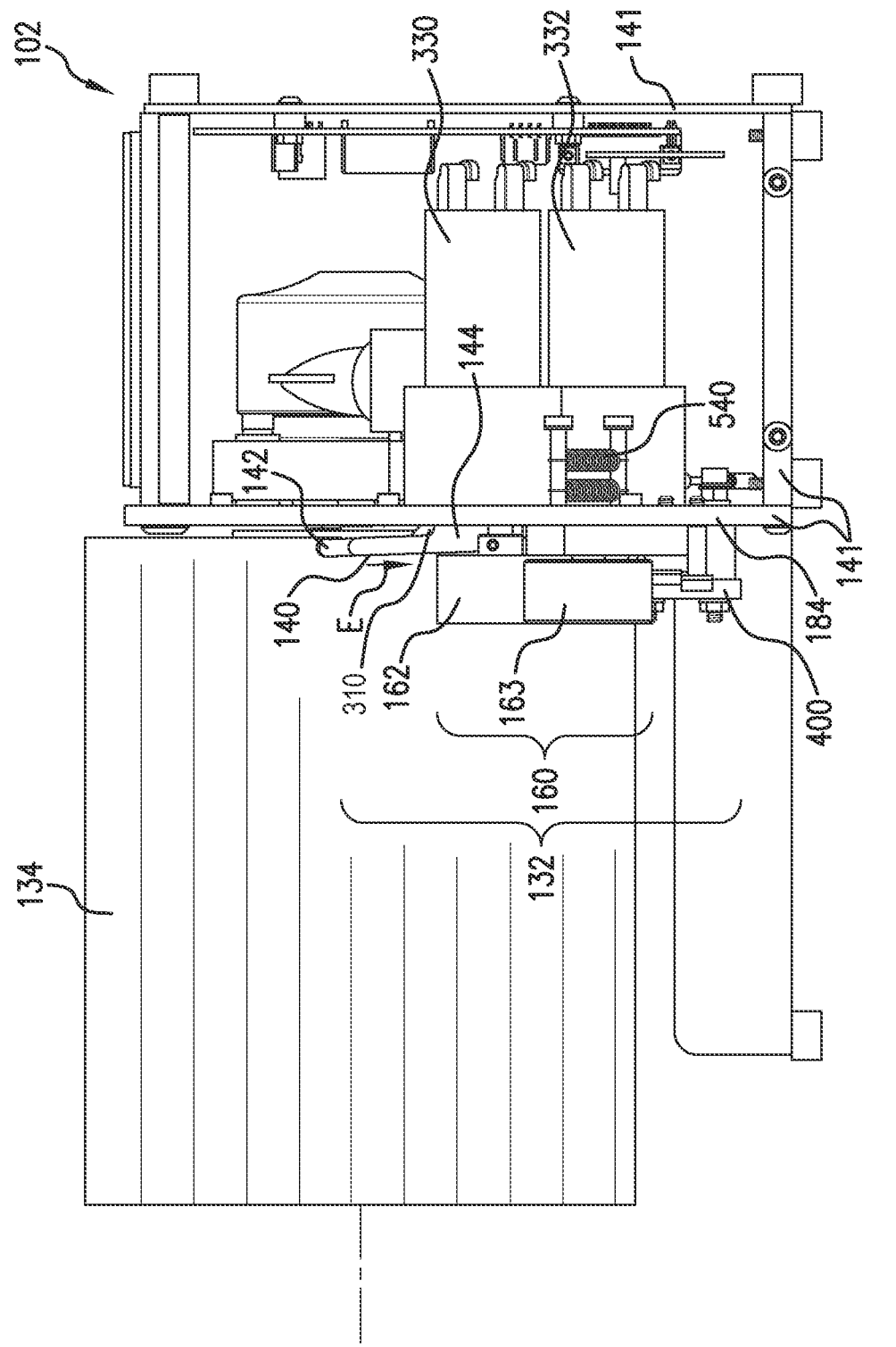
Figure 3A:
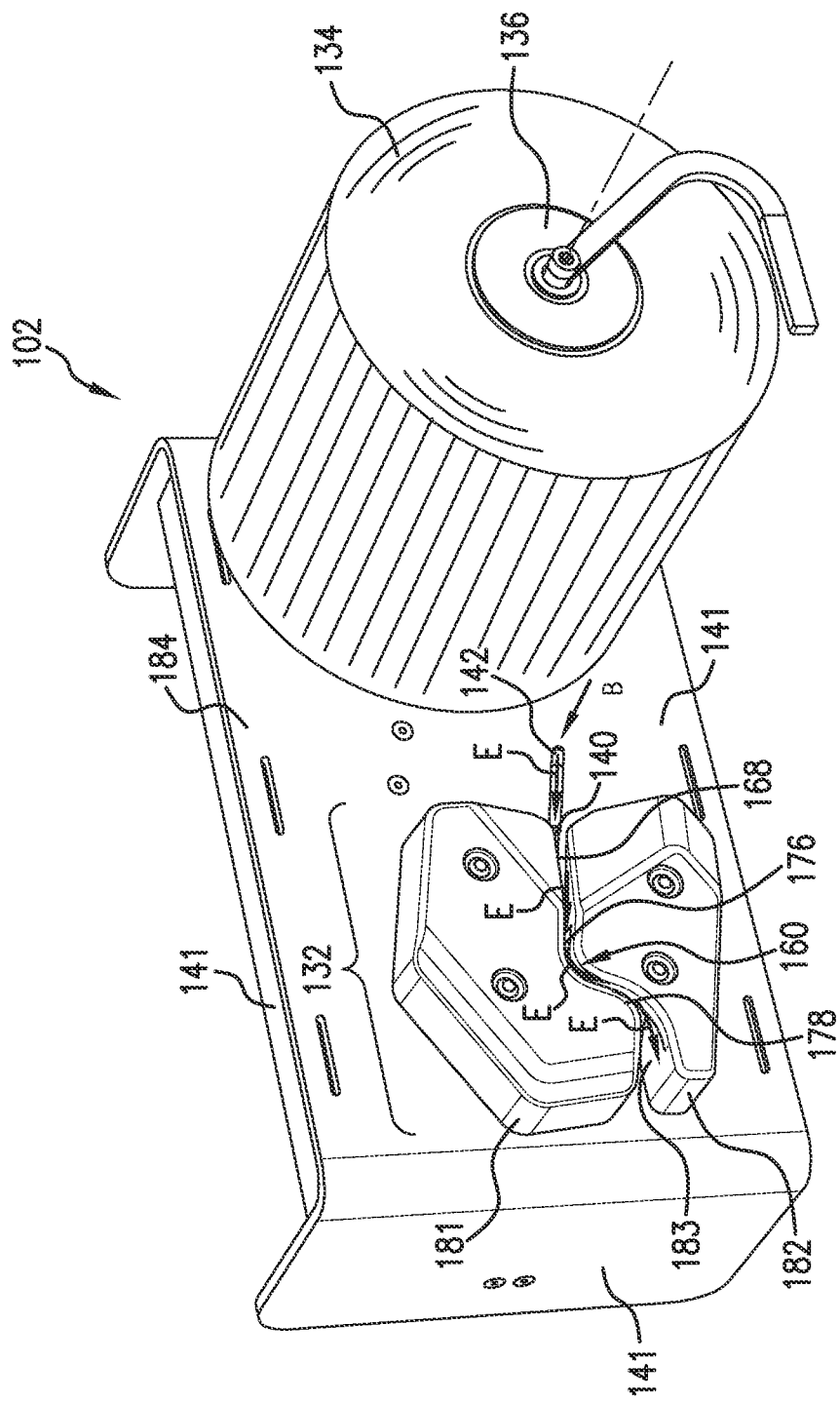
Figure 3C:
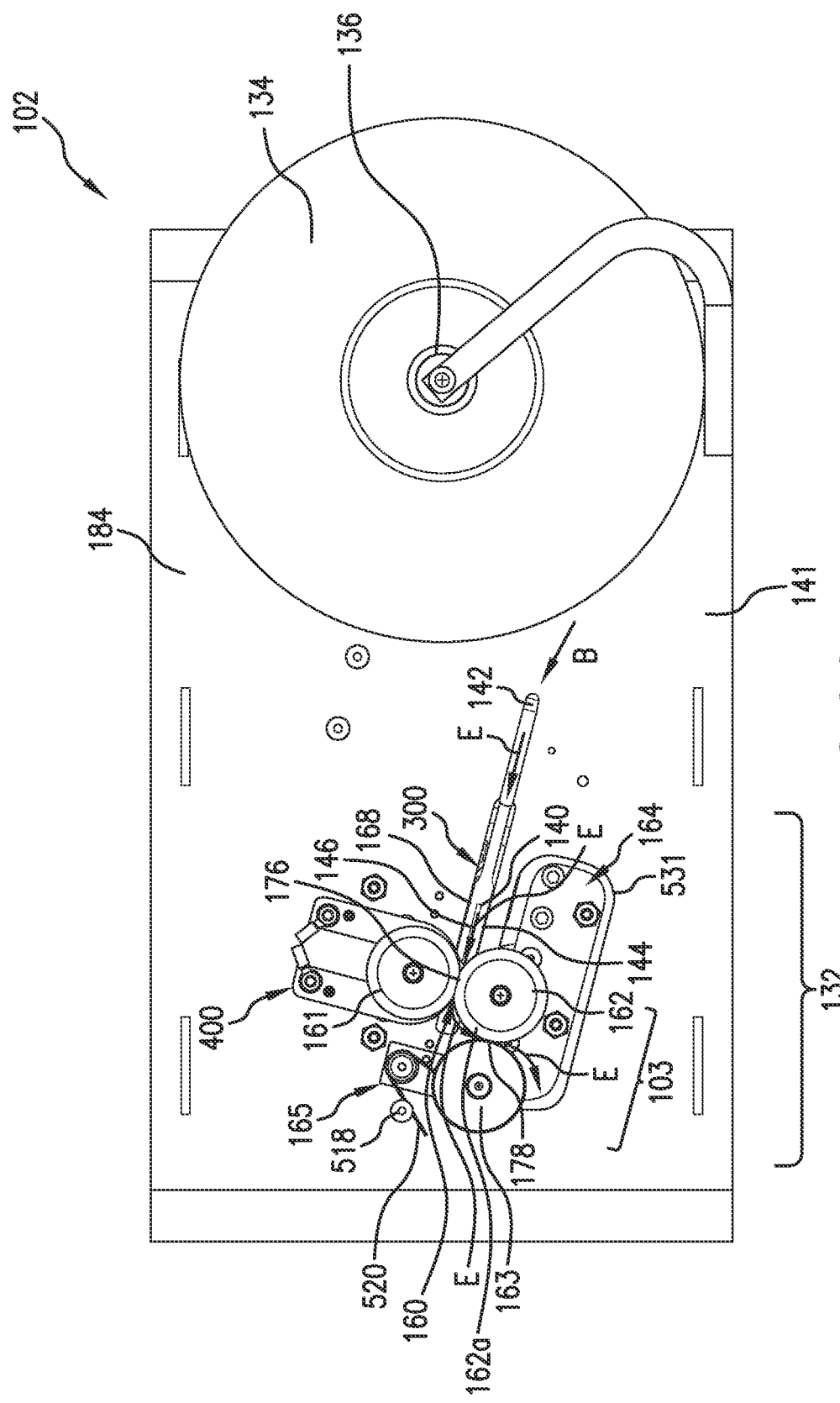
Figure 5:
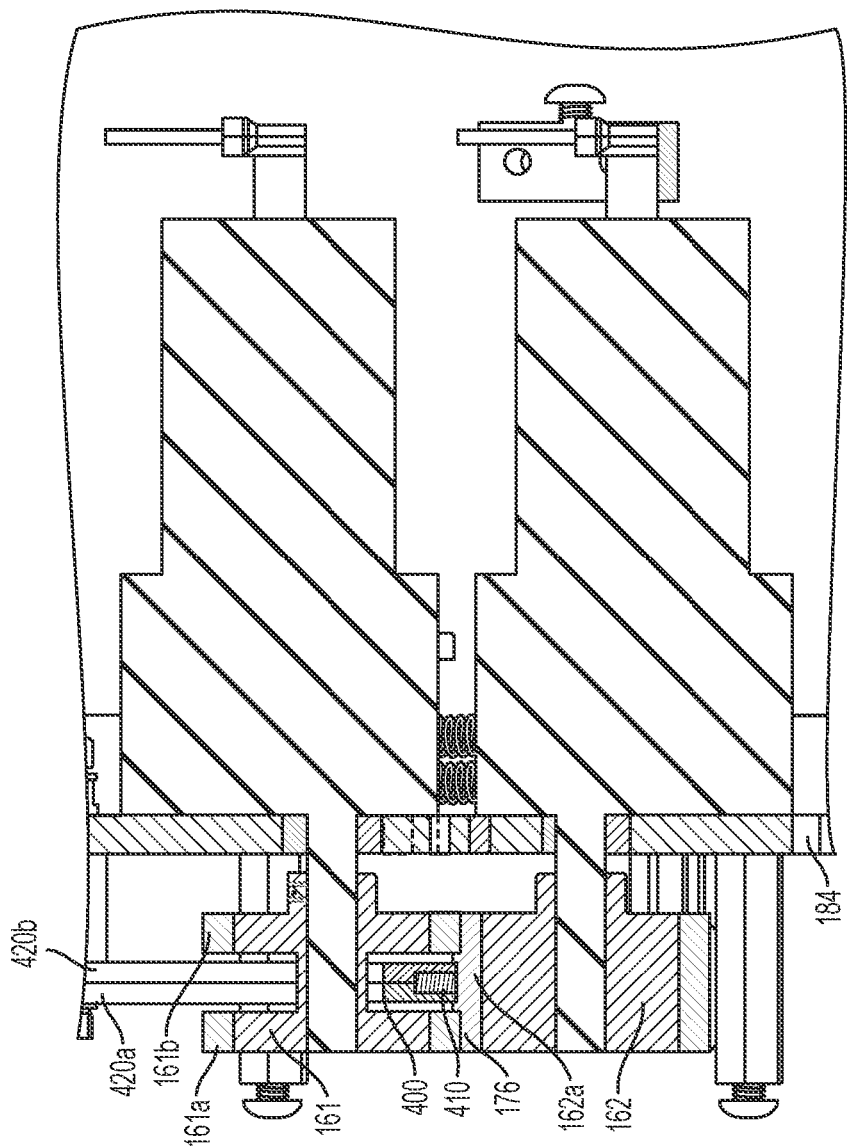
FIG. 5 is a cross section view of a heating assembly taken along cross section line 5-5 shown in FIG. 4B.

In one example, the heating assembly 400 is attached to the housing plate 184. The heating assembly 400 is positioned adjacent to one or more drive members such as compression element 162 or 163. In a more particular example, the heating assembly, when viewed from the side as shown in FIGS. 2D and 5, is located between separate portions of compression element 161, such as portions 161a and 161b. For example, the heater is mounted in a groove on a grooved roller 161. A gap can be provided between the heater assembly 400 and the roller portions 161a and 161b. For example, the gap can be about a ¹⁄₁₆" clearance gap on both sides of the heating element. The gap is preferably maintained to limit the possibility of the separate portions of the rollers dragging on the heater assembly 400. Mounting the roller in the groove between the roller portions 161a and 161b allows the roller to draw material evenly past the heater 400 since there is pressure at the pinch areas on both sides of the heater 400. These roller portions 161a and 161b are driven via a motor or similar motivational source. In various examples, the seal wire 412 is oriented less than about ½ inch from the outer face of the roller portions 161a and 161b. In a preferred embodiment, the seal wire 412 is oriented less than about 0.44 in from the outer face of the roller portions 161a and 161b. Because part of the inflated pillow is flattened as it passes through the rollers, the amount of fill in the pillow is reduced when that area expands after the rollers. Minimizing the distance between the heating element 412 and the outer face of the roller portions 161a and 161b increases the maximum pillow volume.

In various embodiments, the heating assembly 400 is positioned transversely between the nozzle 140 and the chambers 120 being inflated to seal across each of the transverse seals. Some embodiment can have a central inflation channel, in which case a second sealing assembly and inflation outlet may be provided on the opposite side of the nozzle. Other known placement of the web and lateral positioning of the inflation nozzle and sealing assembly can also be used.

After inflation, the flexible structure 100 is advanced along the material path "E" towards the pinch area 176 where it enters the sealing assembly 103. In one example, the pinch area 176 is disposed between adjacent compression elements 161 and 162. The pinch area 176 is the region in which the first and second plies 105,107 are pressed together or pinched to prevent fluid from escaping the chambers 120 and to facilitate sealing by the heating assembly 400. As illustrated in FIG. 5, the pinch area 176 may include a pinch region between the compression element 162 and the heating assembly 400. The pressure produced in this pinch area between compression element 162 and the heating assembly 400 helps form the seal. As indicated above, the heating assembly 400 can be stationary. Thus, in such embodiments, the pinch area 176 between the compression element 162 and the heating assembly 400 includes a moving element, e.g. the compression element 162 and a substantially stationary element, e.g. heating assembly 400. In accordance with various embodiments, the drive mechanism 160 rollers 161 and 162 can be compressed against one another for driving the flexible material 100 through the system and the rollers 161 and 162 can open for threading the flexible material 100 over the drive mechanism 160. Similarly the open state of the drive mechanism 160 also allows threading the flexible material 100 between the heating sealing assembly 400 and the opposing roller 162 as shown in FIG. 5.

The heating assembly 400 includes a heating element assembly 410 disposed adjacent to the pinch location to heat the pinch area 176. While in the various embodiments disclosed herein the compression elements adjacent to the pinch area 176 can roll, the heating element assembly 410 is a stationary heating element. As indicated above, the pinch area 176 is the area where the compression elements 161 and 162 are in contact with each other or with the flexible material 100 and similarly compression element 162 and heating element assembly 410 are in contact with each other or with the flexible material 100. In other embodiments, the heating element assembly 410 does not directly contact the compression element 162. Instead, the compression elements 161 and 162 have sufficient tension to tightly pinch or press the plies 105,107 together and also bias the plies 105, 107 against the heating assembly 400 without necessarily having opposing pressure on the opposite side of the heating assembly 400.

The heating element assembly 410 includes one or more heating elements 412. The heating elements can be any material or design suitable to seal together adjacent plies together. In various embodiments the heating elements 412 can be resistive wire or foil. The wire or foil can be formed of nichrome, iron-chromium-aluminium, cupronickel or other metals suitable for forming and operating a heating element under conditions that are used for sealing plies of the flexible material together allowing the heating element 412 to melt, fuse, join, bind, or unite together the two plies 105,107. In other embodiments, the heating element 412 can be a thin film heater element. The thin film heating element 412 can be formed of barium titanate and lead titanate composites or other materials suitable for forming and operating the heating element under conditions that allow the heating element 412 to obtain a sufficient heat to seal the plies together.

In accordance with various embodiments, a low friction layer 414 is located between the stationary heating element 412 and the moving roller 162 or flexible material 100. The low friction layer 414 is suitable to decrease the wear between the roller 162 and the heating element 412. In embodiments having a wire heating element 412, the low friction layer 414 decreases abrasion to the wire and may also limit the tendency of the wire to cut into the flexible material 100 during sealing. In embodiments having a thin film heat element 412, the low friction layer 414 decreases abrasion to the substrate supporting the heating element 412 and the heating element 412 itself. As the thin film heat element 412 tends to be structurally thinner than wire heating elements, the flow friction layer 414 also limits the deterioration of the thin film heating element 412 due to abrasion. The low friction layer 414 also allows for smoother transition of the flexible material 100 across the heating element 412 improving the seal. In one example, the low friction layer is a thin strip of polytetrafluoroethylene (PTFE) attached across the exposed portion of the heating element 412. Additionally by using the PTFE as a wear element, the layer can be replaced without replacing the more expensive heater element. The PTFE can be attached as a tape to the heating element and surrounding components. A non-adhesive layer of PTFE can also be mechanically positioned relative to the heating element. Mechanical fixturing allows the swapping out of parts without concern over the adhesive. For example, screw attachments or clips or other mechanical hardware to hold the PTFE in place or a housing can be molded to accommodate the layer. In other examples, other low fiction materials that can accommodate the heat created at the heating element 412 such as silicone are applied.

In accordance with one embodiment as illustrated in FIG. 7A-7C or 9, the heating element 412 is a NiChrome wire. The heating element assembly 410 includes the NiChrome wire 412 stretched across a backer block 418. Each side of the NiChrome wire 412 is attached to contacts 415 and 416. Electrical leads 432 and 430 are connected to the contacts 415 and 416 such that current can be provided to the heating element 412 to cause it to heat up. By controlling the width of the wire the heat output is affected. For example, narrowing the wire width increases the heat output compared to the same electrical input. This has the drawback however of narrowing the seal formed on the flexible material. In some examples, the seal width is controlled by providing multiple traces of wire for the heating element.

In accordance with one embodiment as illustrated in FIGS. 8A-8C, the heating element 412 is a thin film heater. In such embodiments, the heating element assembly 410 includes a heating element 412 (as shown in FIGS. 8C and 10A) having a thin film heat trace 412a that connects two contacts 412b. As shown in FIG. 10B, the heating element 412 is suspended by a substrate 417. The two contacts 412b may be connected to contacts 422a and 420a that connect the heating element 410 to the leads 422 and 420. The substrate 417 is suitable to hold the fragile thin film heat trace 412a. For example, the heating element assembly 410 includes a polyimide substrate 417 that back the heat trace 412a. As illustrated in FIG. 10C the heating element 412 is sandwiched between two layers of substrate 417. The heating element 410 can formed by vapor deposition on a polyimide layer. In one example, the polyimide layers are between about 1 and 3 mils thick. In a preferred example, the polyimide layers are about 2 mils thick each. The polyimide layers sandwich the heat trace 412, which in one example is between about 1 and 3 mils thick. In a preferred example, the heat trace 412 is about 2 mils thick. The polyimide layers encapsulate the heat trace and provide isolative properties. The process that binds the polyimide together handles the temperature that the heating element 412 is capable of creating, eliminating the need for adhesives. Typically the adhesives have a lower functional temperature and as such are generally avoided with heating elements. In addition one variable is eliminated from the assembly by bonding the polyimide directly to itself.

In other embodiments the heating element 410 circuit can be formed of layers of fluorinated ethylene propylene (FEP) on the heat trace 412. In this structure high heat and high pressure negates a need to use an adhesive. Also the outer layer of FEP can be textured to decrease friction and sticking with other components. In other embodiments, the thin film circuit 410 can be subsequently wrapped in another material such as silicone providing additional protection, provides insulation, acts as a bonding agent and provides additional manufacturing options such as over-molding of the circuit.

The heating element 410 is held in tension across a backing block 418. Each of the two contacts 412b on the heating element 412 is connected to heating assembly contacts 415 and 416, which in turn are connected to electrical leads 430 and 432. In any of the heating assembly embodiments discussed herein, the heating element 410, contacts 415/416, and the backer block may be positioned inside of a housing 420. In one example, the housing 420 includes two halves 420a and 420b that sandwich the components therebetween. The two half housings may be connected by screws 450 which pass though one housing and engage apertures in the other housing. The low friction layer 414 may also be captured within the housing or in other embodiments may be applied to the exterior of the housing. In other examples, the housing may be over-molded over the components or have other configurations suitable to secure the various components in place relative to one another. In one example, the housing has an elongated "U" shape suitably sized to fit within the groove that separates the two roller portions 161a and 161b so that the roller 161 can rotate in the middle of the "U" shaped housing while the housing remains stationary (see FIG. 6). The housing can also include standoffs 440 and 442 suitable to align the housing 420 with the groove in the roller 161. In one example, the standoffs attach to the plate 184 and space the housing 420 away from the plate the proper distance to align the housing with groove in roller 161. The standoffs 440 and 442 also can house the electrical leads 430 and 432 respectively. While it is discussed herein by way of example, that the heating assembly 400 aligns with a grooved roller, it should be appreciated that other embodiments are also covered, such as alignment with the end of a roller or drum, or alignment with a belt drive mechanism, or any structural relationship that allows the flexible material to be conveyed past the stationary heating assembly. In another embodiment, the flexible material could be stationary and the heating assembly driven across the stationary flexible material.

In accordance with various embodiments, the heat sealer assembly 400 includes a tension mechanism for the heating element 410. The tensioning mechanism is a system configured to hold tension in the heating element 410 across the backing block 418. As the heating element heats up and cools down, the length and/or structure of the heating element changes. These changes can modify the relationship between the heating element 410 and the surrounding components or the flexible material 100. In wire applications, the change in length of the wire heating element can be sufficiently large causing poor seals to form and potentially causing the wire heating element to cut the flexible material 100. As the heating element due to increase in temperature the added length of the heating element is "absorbed" by the tension mechanism allowing the heating element to remain flush against the backing block and stay in position. When the heating element is not flush against the backing block, there is the potential of cutting the film as you seal. Constant pressure will provide a consistent seal. In various embodiments, as shown in FIGS. 7C and 9, one or more of the contacts 415 and 416 can be resilient thus providing a force to stretch the heating element across the backing block 418. In one example, shown in FIG. 7C, the contact 415 is a leaf spring, placing the heating element 412 in tension. The leaf spring 415 is suspended by point 415a on housing 420 allowing the arm of the leaf spring to bend towards the heating element 410 enable the spring force in the opposite direction. The spring tensioning mechanism that tension in the heating element during thermal expansion. The spring tensioning mechanism may also be used as a secondary tensioning mechanism as discussed herein.

In another example, as shown in FIGS. 8C and 10A, the tension mechanism can be built into the heating element assembly 410. For example, the thin film heater 410, as shown in FIG. 10A, forms a wave shape 412a between contacts 412b. The wave form of the thin film heater 410 accommodates for expansion and shrinkage. Various width patterns have been used to create alternate width seal patterns. The thickness of the heat trace or physical pattern can be modified to provide various watt densities. In one example, the wave shape is a sinusoidal pattern. A sinusoidal pattern that allows improved heat (watt density) in the short space provided for sealing. The sinusoidal pattern also minimizes expansion due to heat. In another example, the wave shape 412a is a square wave. Square wave pattern takes up the expansion and contraction of the heating element during thermal expansion. This take-up reduces or eliminates the need for additional spring tension on the element as the shape of the wave itself can accommodate the expansion without unduly reducing the tension on the heating element. The thin film element can have varying widths and lengths by changing the trace composition. Using the wave form, the width of the seal can be modified by changing the height of the amplitude of the wave form. Thus, watt density can be easily controlled while also controlling the width of the seal without increasing the number of traces. The seal produced by the thin film heating element can be as wide as desired which can provide a greater safeguard against leaking in the inflated cushions. The thin film element is also smoother decreasing or eliminating the likelihood of cutting the flexible material 100 with the heating element. The smooth surface of the thin film element also allows various tapes or coverings to be applied to the face of the heater; these coverings can improve heat transmission, reduce friction, or provide improved sealing properties. In some embodiments, the thin film heater can also be used with a secondary tension mechanism (i.e. a spring tensioning mechanism) such as those discussed herein or similar.

While the various embodiments and examples discussed herein are directed to a heating assembly 400 that is stationary, it should be appreciated that various features or elements of the various embodiments and examples discussed herein are applicable to some moving heating assemblies as well. In one example, the heating assembly can be a part of a roller movable with the roller. Thus, some of the heating element assembly structures could move with the roller. In another example, some of the heating element tensioning mechanisms could apply to moving heating assemblies. In other embodiments, the heating element assembly 410 may move with the drive elements, be stationary relative to the moving drive elements, move relative to the movement of the compression elements, move relative to the flexible structure 100, or be stationary relative to the housing 141. Persons of ordinary skill in the art, based on the disclosure herein, can adapt these features and elements to a variety of other systems only some of which are disclosed herein in detail.

After being sealed, the first and second plies 105,107 are cooled allowing the seal to harden by rolling the sealed first and second plies 105,107 around a cooling element. The cooling element may act a heat sink or may provide a sufficient cooling time for the heat to dissipate into the air. In accordance with various embodiments, the cooling element is one or more of the compression elements 161, 162.

Preferably, the flexible structure 100 is continuously advanced through the sealing assembly 103 along the material path "E" and past the heating assembly 400 at an area 176 to form a continuous longitudinal seal 170 along the flexible structure 100 by sealing the first and second plies 105,107 together. The flexible structure 100 exits the pinch area 176, maintaining contact with the element 162. The flexible structure 100 continues along the surface of the compression element 162 to a second pinch area 178 that is the area disposed downstream of the first pinch area 176 as shown in FIGS. 2A-D and 3A-C. The sealing area 174 is the area proximal to the first pinch area 176 in which the flexible structure 100 is being sealed by the heating assembly 400. The longitudinal seal 170 is shown as the phantom line in FIG. 1. Preferably, the longitudinal seal 170 is disposed a transverse distance from the first longitudinal edge 102,106, and most preferably the longitudinal seal 170 is disposed along the mouths 125 of each of the chambers 120.

In the preferred embodiment, the heating assembly 400 and one or more of the compression elements 161, 162 cooperatively press or pinch the first and second plies 105,107 at the first pinch area 176 against the heating assembly 400 to seal the two plies together. The sealing assembly 103 may rely on pressure from compression element 162 against the heating assembly 400 to sufficiently press or pinch the plies 105,107 therebetween. The flexible resilient material of the compression elements 161, 162 allows for the pressure to be well controlled by the positions of the compression elements 161, 162. In various embodiments, the outer surface of the compression elements may be an elastomeric material. For example, the outer surface of the compression elements can be a high temperature shore A 45 durometer silicone rubber with about a ¼" thickness. Other materials or thickness may also be used. For example, one or more of the compression elements may have a low friction outer surface such as polytetrafluoroethylene or similar polymers or low friction materials.

In accordance with various embodiments, the inflation and sealing assembly 132 may further include a cutting assembly 300 to cut the flexible structure 100. Preferably, the cutting member is sufficient to cut the flexible structure 100 as it is moved past the edge along the material path "E". More particularly, the cutting assembly 300 may cut the first and second plies 105, 107 between the first longitudinal edge 101 and mouth 125 of the chambers. In some configurations, the cutting assembly 300 may cut the flexible structure 100 to open the inflation channel 114 of the flexible structure 100 and remove the first and second plies 105, 107 from the inflation nozzle 140. In various embodiments, the inflation channel 114 of the flexible structure can be central to the structure or in other locations. In such embodiments, the cutting assembly 300 can still be adapted to remove the inflation channel 114 from the inflation and sealing assembly, particularly the nozzle 140.

Any and all references specifically identified in the specification of the present application are expressly incorporated herein in their entirety by reference thereto. The term "about," as used herein, should generally be understood to refer to both the corresponding number and a range of numbers. Moreover, all numerical ranges herein should be understood to include each whole integer within the range.

Having described several embodiments herein, it will be recognized by those skilled in the art that various modifications, alternative constructions, and equivalents may be used. The various examples and embodiments may be employed separately or they may be mixed and matched in combination to form any iteration of the alternatives. Additionally, a number of well-known processes and elements have not been described in order to avoid unnecessarily obscuring the focus of the present disclosure. Accordingly, the above description should not be taken as limiting the scope of the invention. Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A protective packaging formation device, comprising:
   an inflation assembly having a fluid conduit that directs fluid between first and second overlapping flexible web plies of a flexible structure;
   a driving mechanism that drives the structure in a downstream direction; and
   a sealing mechanism that includes a heating assembly having a thin-film heater that heats the plies to create a longitudinal seal that seals the first and second plies of the structure together, trapping the fluid therebetween, wherein the thin-film heater includes:
      a substrate, and
      a heat trace on the substrate that has a waveform shape having an amplitude that determines the width of the longitudinal seal, wherein the heat trace is configured to produce sufficient heat, in response to electrical current applied to the heat trace, to create the longitudinal seal.

2. The protective packaging formation device of claim 1, wherein the waveform shape is sinusoidal.

3. The protective packaging formation device of claim 1, wherein the waveform shape is a square wave.

4. The protective packaging formation device of claim 1, wherein each of the heat trace and the substrate is between about 1 and about 3 mils thick.

5. The protective packaging formation device of claim 1, wherein the thin-film heater is between about 2 and about 9 mils thick.

6. The protective packaging formation device of claim 1, wherein the thin-film heater includes two contacts that are electrically connected to opposite sides of the heat trace.

7. The protective packaging formation device of claim 6, wherein the contacts are transversely wider than the amplitude of the waveform shape.

8. The protective packaging formation device of claim 6, wherein the contacts are at least three times as wide as the amplitude of the waveform shape.

9. The protective packaging formation device of claim 1, wherein a majority of the waveform has a substantially consistent amplitude.

10. The protective packaging formation device of claim 1, wherein the heat trace has opposing edges that define the waveform, each of the opposing edges having opposing peaks and valleys.

11. The protective packaging formation device of claim 1, wherein the thin-film heater is mounted in the heating assembly to remain stationary as the structure moves across the heating assembly.

12. The protective packaging formation device of claim 1, wherein the heating assembly further comprises a low-friction layer positioned between the structure and the thin-film heater.

13. The protective packaging formation device of claim 12, wherein the structure directly engages against the heating assembly and moves across the low-friction layer of the heating assembly.

14. The protective packaging formation device of claim 1, wherein:

the heating assembly comprises a roller; and the thin-film heater is mounted on the roller to rotate as the structure is moved past the roller.

15. The protective packaging formation device of claim 1, wherein:

the substrate comprises a first layer and a second layer; and the heat trace is sandwiched between the first and second layers.

16. The protective packaging formation device of claim 15, wherein the first layer, second layer, and heat trace are bonded to one another.

17. The protective packaging formation device of claim 15, wherein the first and second layers are made of polyimide.

18. The protective packaging formation device of claim 15, wherein the substrate encapsulates the heat trace.

19. The protective packaging formation device of claim 1, wherein the waveform shape of the heat trace is configured to reduce longitudinal thermal expansion of the thin-film heater.

20. The protective packaging formation device of claim 19, wherein the heating assembly includes a spring associated with the thin-film heater to retain tension in the thin-film heater during thermal expansion.

21. The protective packaging formation device of claim 19, wherein:

the heating assembly includes a support structure that supports the thin-film heater; and the thin-film heater is mounted directly to the support structure without a spring.

22. The protective packaging formation device of claim 19, wherein the waveform shape is configured to expand or contract to accommodate thermal expansion of the thin-film heater.

23. A protective packaging formation device, comprising:

an inflation assembly having a fluid conduit that directs fluid between first and second overlapping flexible web plies of a flexible structure;

a driving mechanism that drives the structure in a downstream direction; and a sealing mechanism that includes a heating assembly having:

a roller that rotates as the structure moves past the roller; and a thin-film heater mounted to the roller that heats the plies to create a longitudinal seal that seals the first and second plies together trapping the fluid therebetween, wherein the thin-film heater comprises:

a first layer and a second layer; and a heat trace sandwiched between the first and second layers.

24. The protective packaging formation device of claim 23, wherein the thin-film heater includes a spring tensioning mechanism that retains tension in the thin-film heater during thermal expansion.

25. A method of inflating protective packaging, comprising:

directing a fluid between overlapping plies of a flexible structure to inflate inflatable chambers that are defined by a seal pattern between the overlapping plies and that are arranged in a longitudinal series;

driving the overlapping plies with the inflated chambers longitudinally through a pinch area in which a compression element compresses the overlapping plies together sufficiently tightly to retain the fluid between the plies; and providing electrical current to a heating element adjacent the pinch area, which heating element includes:

a substrate, and a heat trace disposed on the substrate and having a waveform shape that has an amplitude, wherein the electrical current is provided through the heat trace to cause the heat trace to heat the overlapping plies in the pinch area sufficiently to heat seal the overlapping plies together, forming a longitudinal seal between the overlapping plies that seals the fluid in the inflated chambers, such that the longitudinal seal has a width determined by the amplitude.

* * * * *